(12) United States Patent
Ishikawa et al.

(10) Patent No.: US 8,208,179 B2
(45) Date of Patent: Jun. 26, 2012

(54) APPARATUS, SYSTEM, AND METHOD FOR IMAGE PROCESSING

(75) Inventors: Masaaki Ishikawa, Tokyo (JP); Hiroshi Shimura, Yokosuka (JP); Haike Guan, Yokohama (JP); Taeko Ishizu, Yokohama (JP); Hiroyuki Yoshida, Tottori (JP); Takashi Saitoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 437 days.

(21) Appl. No.: 12/320,504

(22) Filed: Jan. 28, 2009

(65) Prior Publication Data

US 2009/0190182 A1    Jul. 30, 2009

(30) Foreign Application Priority Data

Jan. 29, 2008    (JP) .................................. 2008-018295

(51) Int. Cl.
*H04N 1/40* (2006.01)
(52) U.S. Cl. ........ 358/3.28; 358/1.15; 283/72; 713/150; 713/176
(58) Field of Classification Search ........................ None
See application file for complete search history.

(56) References Cited

U.S. PATENT DOCUMENTS

| | | | |
|---|---|---|---|
| 7,031,491 B1 | 4/2006 | Donescu et al. | |
| 7,263,203 B2 * | 8/2007 | Rhoads et al. | 382/100 |
| 2002/0066019 A1 | 5/2002 | Amonou et al. | |
| 2004/0120544 A1 * | 6/2004 | Eguchi et al. | 382/100 |
| 2004/0247155 A1 | 12/2004 | Eguchi | |
| 2005/0041263 A1 | 2/2005 | Ishikawa et al. | |
| 2007/0064973 A1 | 3/2007 | Meaney | |
| 2007/0074029 A1 | 3/2007 | Yamamoto | |
| 2007/0127771 A1 | 6/2007 | Kaneda et al. | |
| 2007/0199992 A1 * | 8/2007 | Manheim | 235/462.01 |
| 2008/0166013 A1 | 7/2008 | Ishikawa et al. | |
| 2008/0232639 A1 | 9/2008 | Ishikawa et al. | |
| 2008/0232640 A1 | 9/2008 | Ishizu et al. | |

FOREIGN PATENT DOCUMENTS

| | | |
|---|---|---|
| EP | 1 220 152 | 7/2002 |
| EP | 1 703 460 | 9/2006 |
| JP | 07-036317 | 2/1995 |
| JP | 09-164739 | 6/1997 |
| JP | 2000-216985 | 8/2000 |

(Continued)

OTHER PUBLICATIONS

Abstract of JP 09-016701 published on Jan. 17, 1997.

(Continued)

*Primary Examiner* — Dov Popovici
*Assistant Examiner* — John Wallace
(74) *Attorney, Agent, or Firm* — Harness, Dickey & Pierce, P.L.C.

(57) ABSTRACT

An image processing apparatus includes an image information acquisition device, an embedment information acquisition device, an embedment mode information acquisition device, an embeddability determination device, and an embeddability information output device. The image information acquisition device acquires image information on a target image into which supplemental information is to be embedded. The embedment information acquisition device acquires embedment information on the supplemental information. The embedment mode information acquisition device acquires embedment mode information on an embedment mode in which the supplemental information is embedded in the image information. The embeddability determination device determines embeddability of the supplemental information into the image information based on the embedment mode information, the embedment information, and the image information. The embeddability information output device outputs determination-result information on a determination result of the embeddability determined by the embeddability determination device.

17 Claims, 14 Drawing Sheets

FOREIGN PATENT DOCUMENTS

| | | |
|---|---|---|
| JP | 2001-197297 | 7/2001 |
| JP | 2001-346032 | 12/2001 |
| JP | 3335265 | 10/2002 |
| JP | 2004-274092 | 9/2004 |
| JP | 2005-235181 | 9/2005 |
| WO | WO 2007/003008 | 1/2007 |

OTHER PUBLICATIONS

European Search Report for corresponding foreign application.

* cited by examiner

US 8,208,179 B2

APPARATUS, SYSTEM, AND METHOD FOR IMAGE PROCESSING

CROSS-REFERENCE TO RELATED APPLICATIONS

The present patent application claims priority pursuant to 35 U.S.C. §119 from Japanese Patent Application No. 2008-018295, filed on Jan. 29, 2008 in the Japan Patent Office, the entire contents of which are hereby incorporated herein by reference.

BACKGROUND OF THE INVENTION

1. Field of the Invention

The present invention relates to an apparatus, system, and method of image processing, and more specifically, to an apparatus, system, and method of embedding information into an image.

2. Description of the Background

As electronic information has become widespread, image processing apparatuses, such as printers and facsimile machines, have become indispensable to output such electronic information. Such an image processing apparatus may be configured as a multi-functional device having the several capabilities of a printer, facsimile machine, scanner, and copier. Such an image processing apparatus may also be capable of embedding supplemental information into a target image for various purposes, such as copy protection of digital content or integration of digital data and printed data.

In conventional information embedment technology, the volume of embeddable information varies depending on the information embedment mode or the target image in which information is to be embedded. In fact, the information embedment mode is preferably determined based on the target image in which information is to be embedded.

At the same time, information embedment is subject to several requirements. For example, when a relatively large volume of information is embedded in an original image, a user may request that the embedded information affect the original image as little as possible. Further, a user may request to enhance the intensity of information embedment or the extractability of embedded information. Hence, for such information embedment into an image, a conventional image processing apparatus may prompt a user to designate a desired embedment mode or setting.

SUMMARY OF THE INVENTION

The present disclosure provides an image processing apparatus capable of easily determining whether or not information is embeddable in an image and selecting an appropriate information embedment mode or setting.

In one illustrative embodiment, an image processing apparatus includes an image information acquisition device, an embedment information acquisition device, an embedment mode information acquisition device, an embeddability determination device, and an embeddability information output device. The image information acquisition device acquires image information on a target image into which supplemental information is to be embedded. The embedment information acquisition device acquires embedment information on the supplemental information. The embedment mode information acquisition device acquires embedment-mode information on an embedment mode in which the supplemental information is embedded in the image information. The embeddability determination device determines embeddability of the supplemental information into the image information based on the embedment mode information acquired by the embedment mode information acquisition device, the embedment information acquired by the embedment information acquisition device, and the image information acquired by the image information acquisition device. The embeddability information output device outputs determination-result information on a determination result of the embeddability determined by the embeddability determination device.

In another illustrative embodiment, an image processing system includes an image processing apparatus. The image processing apparatus further includes an image information acquisition device, an embedment information acquisition device, an embedment mode information acquisition device, an embeddability determination device, and an embeddability information output device. The image information acquisition device acquires image information on a target image into which supplemental information is to be embedded. The embedment information acquisition device acquires embedment information on the supplemental information. The embedment mode information acquisition device acquires embedment mode information on an embedment mode in which the supplemental information is embedded in the image information. The embeddability determination device determines embeddability of the supplemental information into the image information based on the embedment mode information acquired by the embedment mode information acquisition device, the embedment information acquired by the embedment information acquisition device, and the image information acquired by the image information acquisition device. The embeddability information output device outputs determination-result information on a determination result of the embeddability determined by the embeddability determination device.

In still another illustrative embodiment, a method of image processing includes acquiring image information on a target image into which supplemental information is to be embedded, acquiring mode information on an embedment mode in which the supplemental information is embedded in the image information, determining embeddability of the supplemental information into the image information based on the acquired embedment mode information, the acquired embedment information, and the acquired image information, and outputting determination-result information on a determination result of the embeddability.

In still another illustrative embodiment, an information-processing-apparatus-readable storage medium storing program codes to cause an information processing apparatus to execute a method including acquiring image information on a target image into which supplemental information is to be embedded, acquiring mode information on an embedment mode in which the supplemental information is embedded in the image information, determining embeddability of the supplemental information into the image information based on the acquired embedment mode information, the acquired embedment information, and the acquired image information, and outputting determination-result information on a determination result of the embeddability.

BRIEF DESCRIPTION OF THE DRAWINGS

A more complete appreciation of the disclosure and many of the attendant advantages thereof will be readily acquired as the same becomes better understood by reference to the following detailed description when considered in connection with the accompanying drawings, wherein.

Figure 1:
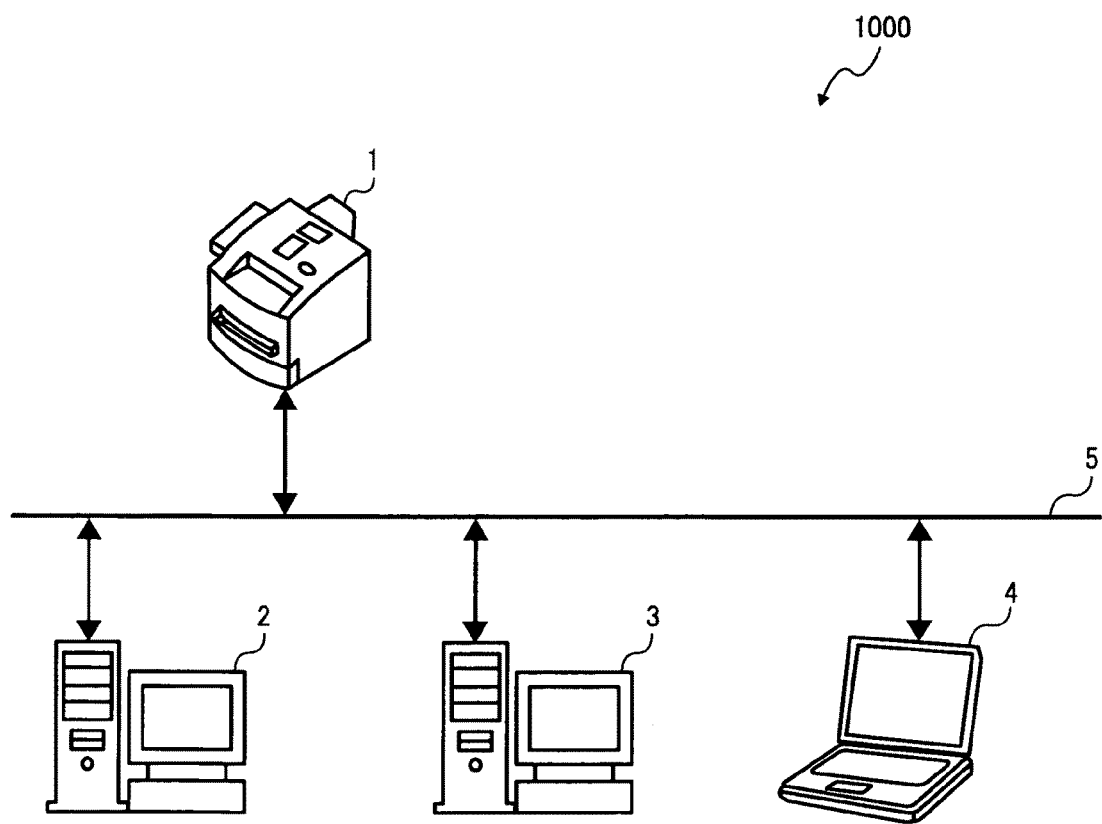
FIG. 1 is an illustration of an image processing system according to an illustrative embodiment of the present disclosure.

The accompanying drawings are intended to depict illustrative embodiments of the present disclosure and should not be interpreted to limit the scope thereof. The accompanying drawings are not to be considered as drawn to scale unless explicitly noted.

DETAILED DESCRIPTION OF ILLUSTRATIVE EMBODIMENTS

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Below, illustrative embodiments according to the present disclosure are described with reference to the attached drawings.

As one illustrative embodiment, a description is given below of an image processing apparatus 1 capable of receiving a print job from a client machine via a network and embedding information into an image in executing image formation.

FIG. 1 is an illustration showing a network configuration of an image processing system 1000 including the image processing apparatus 1 according to the present illustrative embodiment. As illustrated in FIG. 1, the image processing system 1000 includes the image processing apparatus 1, client machines 2 to 4, and a network 5. In one example, the image processing apparatus 1 is an MFP (multi functional peripheral) capable of receiving a print job from or transmitting scanned image information to the client machines 2 to 4 via the network 5. The client machines 2 to 4 are information processing apparatuses, such as PCs (personal computers), with user interfaces including operation devices, such as a mousse and keyboard, and display devices, such as an LCD (liquid crystal displays).

Next, the image processing apparatus 1 according to the present illustrative embodiment is described.

Figure 2:
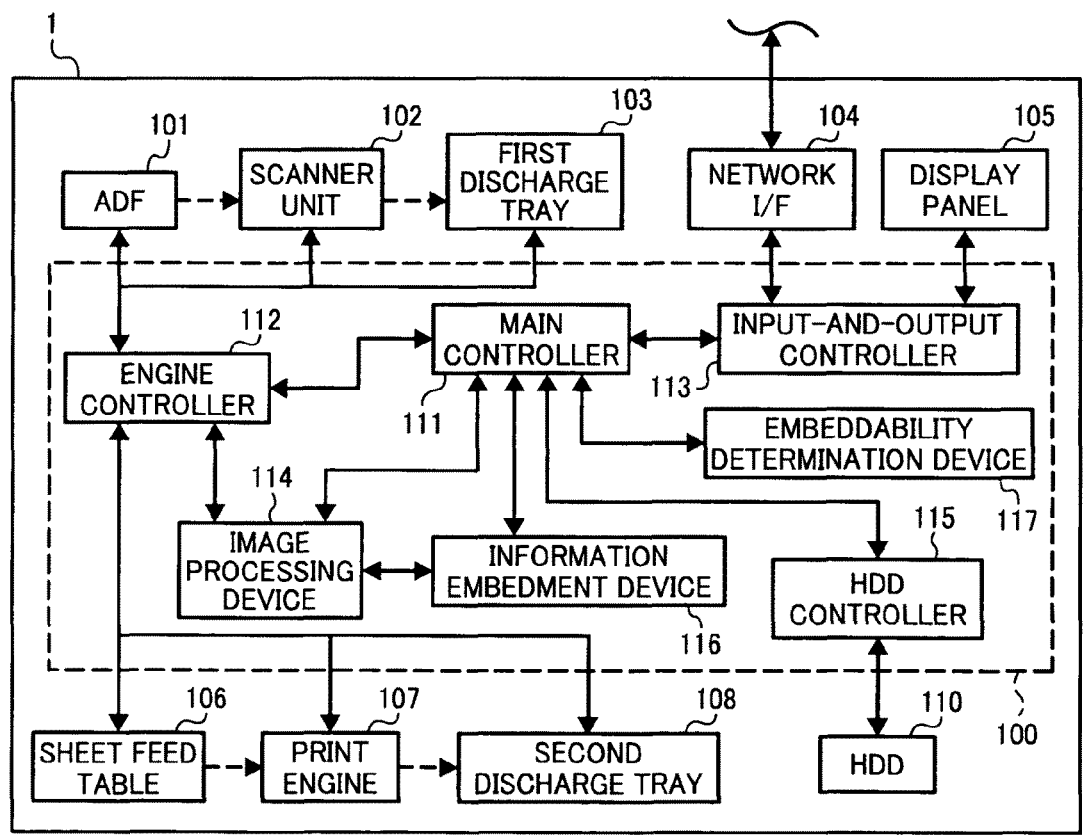
FIG. 2 is a block diagram illustrating a configuration of an image processing apparatus according to an illustrative embodiment.

FIG. 2 is a block diagram illustrating a configuration of the image processing apparatus 1 according to the present illustrative embodiment. As illustrated in FIG. 1, the image processing apparatus 1 includes a control unit 100, an ADF (auto document feeder) 101, a scanner unit 102, a first discharge tray 103, a network I/F (interface) 104, a display panel 105, a sheet feed table 106, a print engine 107, a second discharge tray 108, and a HDD (hard disk drive) 110. The control unit 100 further includes a main controller 111, an engine controller 112, an input-and-output controller 103, an image processing device 114, an HDD controller 115, an information embedment device 116, and an embeddability determination device 117. In FIG. 2, electric connections are indicated by solid arrows, and flows of a sheet and document bundle are indicated by dotted arrows.

The network I/F 140 is an interface through which the image processing apparatus 1 communicates other devices, such as the client machines 2 to 4, via the network 5. Print jobs sent from the client machines 2 to 4 are input to the control unit 100 via the network I/F 104, and image formation based on the print jobs is executed in accordance with control of the control unit 100. The display panel 105 is an output interface visually displaying a status of the image processing apparatus 1 and an input interface serving as, for example, a touch panel with which a user operates the image processing apparatus 1.

The control unit 100 is configured as a combination of software and hardware to control the image processing apparatus 1. Specifically, control programs, such as firmware, stored in a non-volatile storage medium, such as a ROM (read only memory), an EEPROM (electronically erasable and programmable ROM), the HDD 110, or an optical disk are loaded on a volatile memory (hereinafter "memory"), such as a DRAM (dynamic random access memory) and constructed as a software controller in accordance with control of a CPU (central processing unit). The control unit 100 is constructed from the software controller and hardware components, such as integrated circuits.

The main controller 111 instructs to control components of the control unit 100. The engine controller 112 controls or drives, for example, the print engine 107 and the scanner unit 102. The input-and-output controller 113 inputs, to the main controller 111, a print job input via the network I/F 104 or operation information input from a display panel 105 by a user. The input-and-output controller 113 also controls the display panel 105 to display information based on the instruction of the main controller 111 or transmits information to a host machine via the network I/F 104.

The image processing device 114 generates drawing information based on information contained in a print job, a document stored in the HDD 110, or any other suitable source. The drawing information is used for the print engine 107 to draw an image in image formation. The image processing device 114 processes imaging data input from the scanner unit 102 to generate image data. The image data is stored as a product (scanned information) of the scanning operation onto the HDD 110 via the HDD controller 115 or transmitted to a host machine via the network I/F 104.

The HDD controller 115 controls storing of information onto the HDD 110 and readout of information from the HDD 110 in accordance with the control of the main controller 111. The HDD 110 stores, for example, image information input as a print job, image information read from the scanner unit 102, network address information of client machines 2 to 4 connected via the network I/F 104, an address book including destination information used when the image processing apparatus 1 operates as a facsimile machine, and setting values referred in operations of the image processing apparatus 1.

The information embedment device 116 embeds information into an image that is input as a print job and output to a paper sheet using the print engine 107 or an image read using the scanner engine 102. The information embedment device 116 is capable of embedding (adding) information in accordance with a plurality of information embedment modes (information adding modes). When a user instructs to embed information into a target image, the embeddability determination device 117 determines whether or not the information is embeddable in the target image. A further description of the embeddability determination device 117 is given in detail later.

When the image processing apparatus 1 operates as a printer, the input-and-output controller 113 receives a print job via a USB (universal serial bus) or LAN (local area network) connected to the network I/F 104. Receiving the print job from the input-and-output controller 113, the main controller 111 controls the image processing device 114 to execute image processing. In accordance with an instruction from the main controller 111, the image processing device 114 generates drawing information based on image information contained in the print job or an accumulated document stored in the HDD 110. The drawing information generated with the image processing device 114 is sequentially spooled in the HDD 110.

Controlled by the main controller 111, the engine controller 112 drives the sheet feed table 106 to transport a print sheet to the print engine 107. The engine controller 112 also reads drawing information spooled in the HDD 110 to input the drawing information to the print engine 107. Based on the drawing information received from the engine controller 112, the print engine 107 forms an image on the sheet transported from the sheet feed table 106. Thus, the print engine 107 operates as an image forming device, and is applicable to an image forming mechanism of the inkjet method, the electrophotographic method, or any other suitable method. After the image formation, the sheet having the image is discharged to the discharge tray 108.

When the image processing apparatus 1 operates as a scanner, the input-and-output controller 113 sends a scan execution signal to the main controller 111 in response to a scan execution instruction input from the display panel 105 by a user or from one of the clients 2 to 4 via the network I/F 104. The main controller 111 controls the engine controller 112 based on the scan execution signal received from the input-and-output signal 113. The engine controller 112 drives the ADF 101 to transport a target document set on the ADF 101 to the scanner unit 102. The engine controller 112 also drives the scanner unit 102 to pick up an image of the document transported from the ADF 101. Alternatively, if a target document is set not on the ADF 101 but directly on the scanner unit 102, the scanner unit 102 picks up an image in the document in accordance with the control of the engine controller 112. Thus, the scanner unit 102 operates as an image pickup device.

In the image pickup operation, an image pickup element, such as a CCD (charge-coupled device), in the scanner unit 102 optically scans a target document to generate image pickup information based on optical information. The engine controller 112 transmits the image pickup information generated by the scanner unit 102 to the image processing device 114. Controlled by the main controller 111, the image processing device 114 generates image information based on the image pickup information received from the engine controller 112. The image information generated by the image processing device 114 is sequentially spooled in the HDD 110. In response to an instruction from a user, the image information spooled in the HDD 110 is stored in the HDD 110 or transmitted to an external host machine via the input-and-output controller 113 and the host I/F 104.

When the image processing apparatus 1 operates as a copier, the image processing device 114 generates drawing information based on the image pickup information received by the engine controller 112 from the scanner unit 102, or the image information generated by the image processing device 114 and stored in the HDD 110. As in the case with the printing operation, the engine controller 112 drives the print engine 107 based on the drawing information.

According to the present illustrative embodiment, in a print job accompanying information embedment, the image processing apparatus 1 determines whether or not information subjected to an embedment instruction is embeddable in a target image, and reports a determination result to a user.

Figure 3:
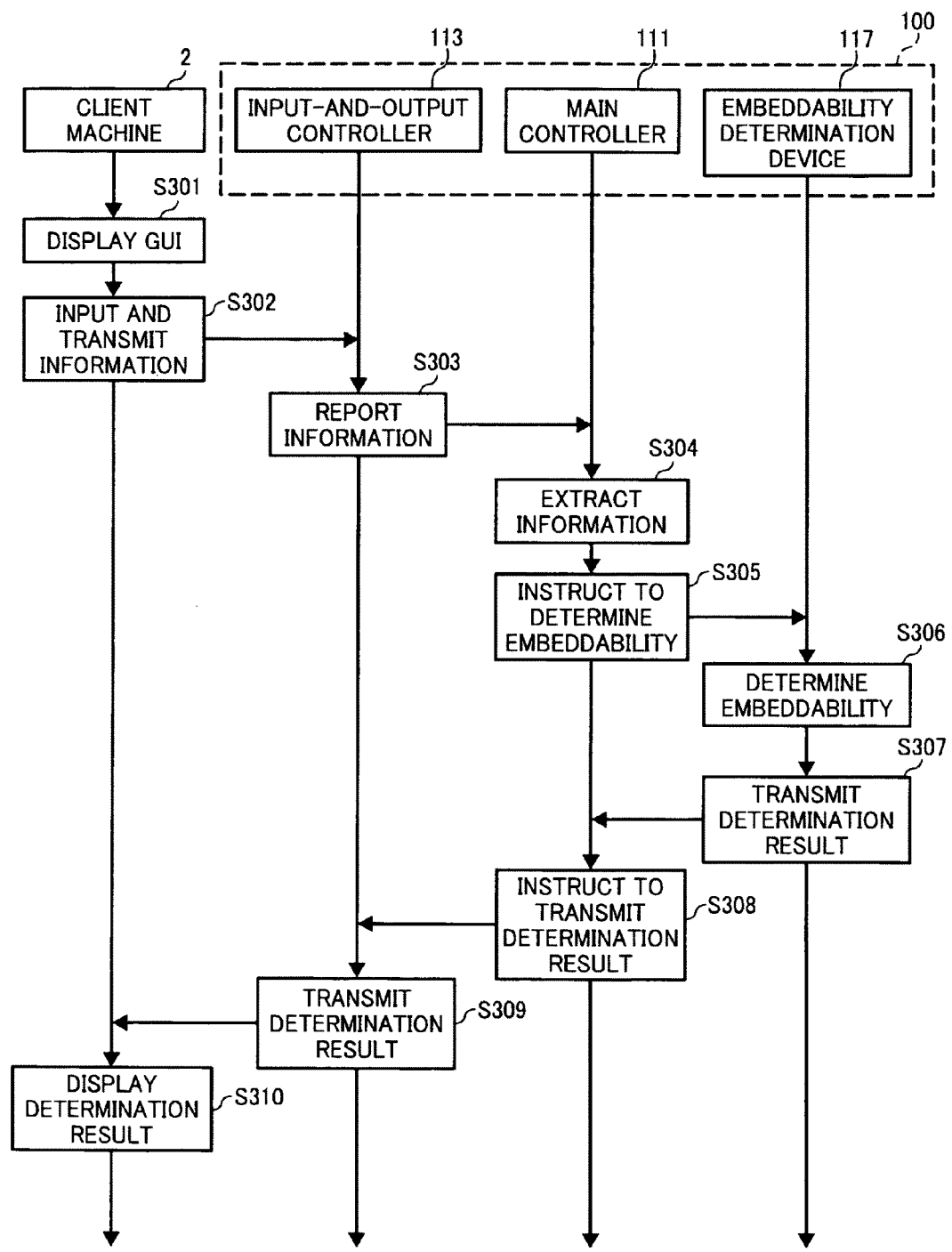
FIG. 3 is a sequence diagram illustrating an operation of the image processing apparatus of FIG. 2.

Below, operation of the image processing system 1000 according to the present illustrative embodiment is described with reference to FIG. 3. FIG. 3 is a sequence diagram illustrating an operation of the image processing system 1000 according to the present illustrative embodiment. It is to be noted that, although a description is given below taking an example in which the client machine 2 transmits a print job, the image processing system 1000 operates in a similar manner when the client machine 3 or 4 transmits a print job.

When transmitting a print job, a user operates the client machine 2 to display a GUI (graphical user interface) of a setting screen for setting an information embedment mode on a display device of the client machine 2 (at S301 of FIG. 3). Information on the GUI may be stored in advance in the client machine 2 or acquired from the image processing apparatus 1.

Figure 4:
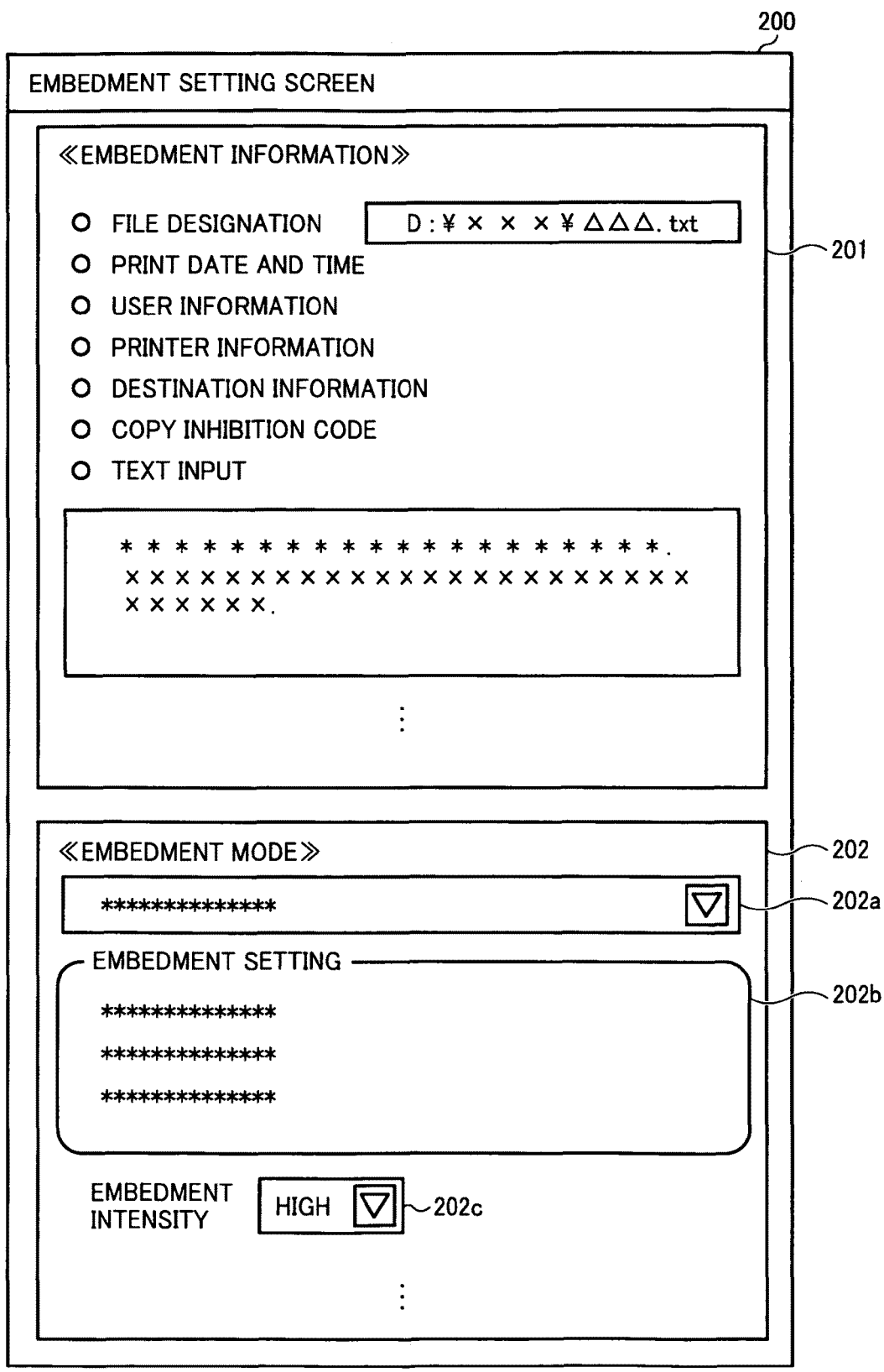
FIG. 4 is an illustration showing a display example of a setting screen for information embedment.

FIG. 4 illustrates an example of the GUI displayed in the display device of the client machine 2 at S301 of FIG. 3. As illustrated in FIG. 4, according to the present illustrative embodiment, a setting screen 200 for setting embedment information includes an embedment information designation section 201 to designate information to be embedded and an embedment mode designation section 202 to designate an embedment mode and/or other conditions with which the information is embedded.

As illustrated in FIG. 4, the embedment information designation section 201 includes items, such as "file designation", "print date and time", "destination information", "copy inhibition code", and "text input", as the information to be embedded in an image. A user instructs information embedment by checking a desired item on the information to be embedded in an image. Alternatively, after checking items, such as "file designation" and "text input", a user may input a file pass indicating a storage location of a file to be embedded or a text to be embedded.

In the embedment mode designation section 202 are displayed a mode-selection portion 202a for selecting an information embedment mode available in the image processing apparatus 1, a setting input portion 202b for inputting settings associated with the mode selected in the mode selection portion 202a, and an embedment intensity selection portion 202c for selecting an intensity of information embedment. The user selects a desired embedment mode in the mode selection portion 202a, inputs setting information associated with the selected mode in the setting input portion 202b, and selects an intensity of information embedment in the embedment intensity selection portion 202c. Here, with reference to FIGS. 5A to 5C, a description is given of examples of items input in the setting input portion 202b in accordance with the embedment mode selected in the mode selection portion 202a. According to the present illustrative embodiment, for example, "frequency transformation mode", "dot pattern mode", and "outline modification mode" are selectable in the mode selection portion 202a.

Figure 5A:
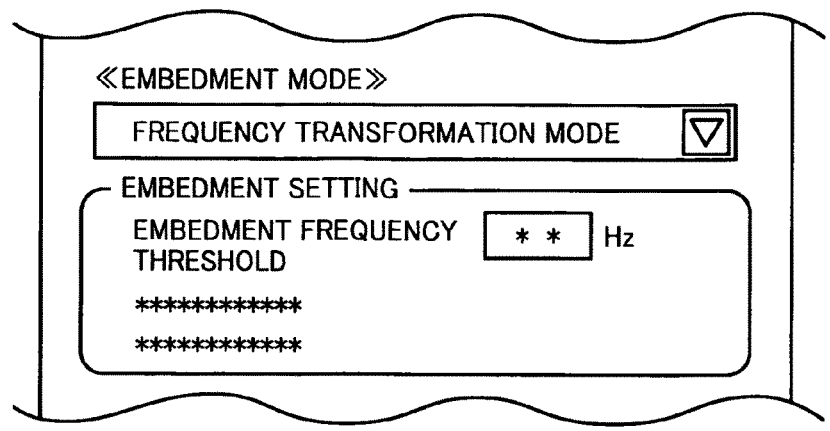
FIGS. 5A to 5C are illustrations showing display examples of a portion of the setting screen of FIG. 4.

FIG. 5A is an illustration showing a display example of the mode selection portion 202a and the setting input portion 202b when the frequency transformation mode is selected. In the frequency transformation mode, information is embedded by transforming image information to frequency components using a frequency transformation mode, such as wavelet transformation, and modifying pixels of frequencies more than a threshold frequency according to a certain rule. Since pixels are modified, a target image is modified in an exact sense. However, since certain high-frequency information may be difficult for human eyes to recognize, such information can be embedded in the target image without being recognized. Meanwhile, in order to embed a larger volume of information, a relatively low frequency may be set as a threshold frequency to determine an information embedment area. In such a case, a user may set such a threshold frequency using the setting input portion 202b.

Figure 5B:
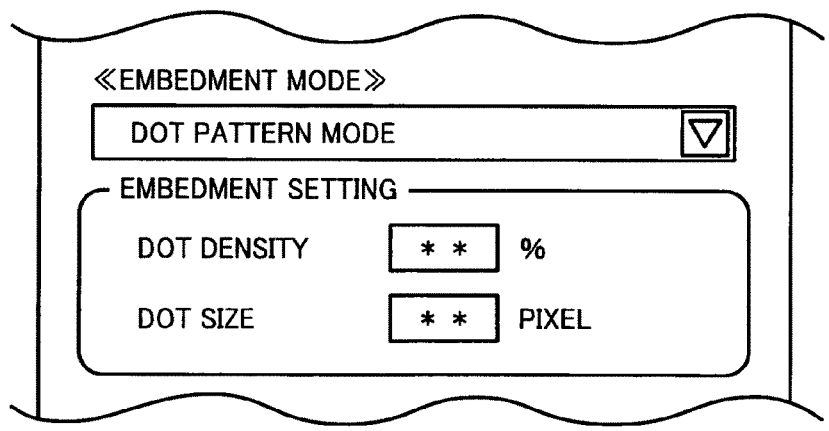

FIG. 5b is an illustration showing a display example of the mode selection portion 202a and the setting input portion 202b displayed when the dot pattern mode is selected. In the dot pattern mode, a dot pattern is superimposed onto the image to embed information. The dot pattern mode allows information to be embedded in a target image only by coding the information with a dot pattern and superimposing the dot pattern, thereby providing advantages such as a reduction in processing time. Meanwhile, such a dot pattern superimposed onto an image might affect the visibility of the image. Further, when a dot pattern is superimposed onto a solid portion of an image, a portion of the dot pattern might not be properly extracted. In order to embed a larger volume of information, it is necessary to superimpose a large number of dots and thus increase the dot density. In such a case, a user may set a desired dot size or dot density using the setting input portion 202b.

Figure 5C:
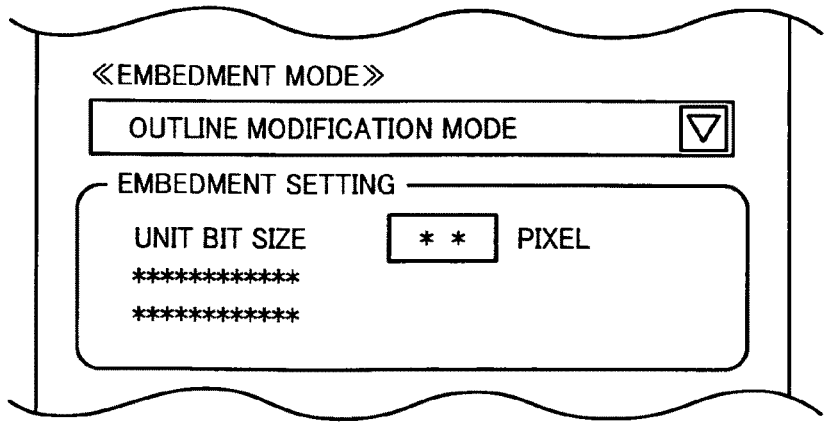

FIG. 5C is an illustration showing a display example of the mode selection portion 202a and the setting input portion 202b when the outline modification mode is selected. In the outline modification mode, the outline of content, such as a character or figure, is modified according to a certain rule to embed information into a target image. For example, convex portions may be formed in the outline of a character in units of several pixels so that the presence and absence of the convex portion represent "0" and "1" of digital information. Alternatively, instead of the presence and absence of the convex portion, convex and concave portions may represent "0" and "1" of digital information. The convex portions formed in units of several pixels are difficult for a user to recognize, thus not preventing the visibility of such a character. Reducing the number of pixels constituting one unit of concave and convex portions that represents bits allows a larger volume of information to be embedded in a target image. A user may set the number of pixels of the concave or convex portion constituting the bit unit using the setting input portion 202b.

The embedment intensity selection portion 202c sets a post-embedment extractability of information to be embedded in an image. Setting a higher embedment intensity increases a possibility with which embedded information may be extracted from the image. The intensity of information embedment may be adjusted by inputting identical information in a multiplexing manner. In such a case, setting a relatively higher embedment intensity may reduce the volume of information embeddable in the image.

When a user inputs information in the setting screen 200, the information is transmitted along with a print job to the image processing apparatus 1. For example, such input information may be stored in a header portion of a target image, and transmitted at S302 along with the print job. Receiving the information input to the image processing apparatus 1 via the network I/F 104, at S303 the input-and-output controller 113 transmits the information to the main controller 111. Receiving the information from input-and-output controller 113, at S304 the main controller 111 acquires image information on a target image in which information is to be embedded, the information to be embedded in the target image, information on an embedment mode, settings associated with the embedment mode, and embedment intensity. Thus, according to the present illustrative embodiment, the main controller 111 operates as an image information acquisition device, an embedment information acquisition device; and an embedment mode information acquisition device. Based on the plurality of pieces of information acquired at S304, at S305 the main controller 111 transmits, to the embeddability determination device 117, an instruction for determining whether or not the information to be embedded is embeddable in the target image.

Receiving the instruction, at S306 the embeddability determination device 117 determines whether or not the information to be embedded is embeddable in the target image based on the information acquired from the main controller 111. At S306 the embeddability determination device 117 executes different types of processing depending on designated embedment modes. Below, the embeddability determination processing at S306 is described for the each of the embedment modes described with reference to FIGS. 5A to 5C.

Figure 6:
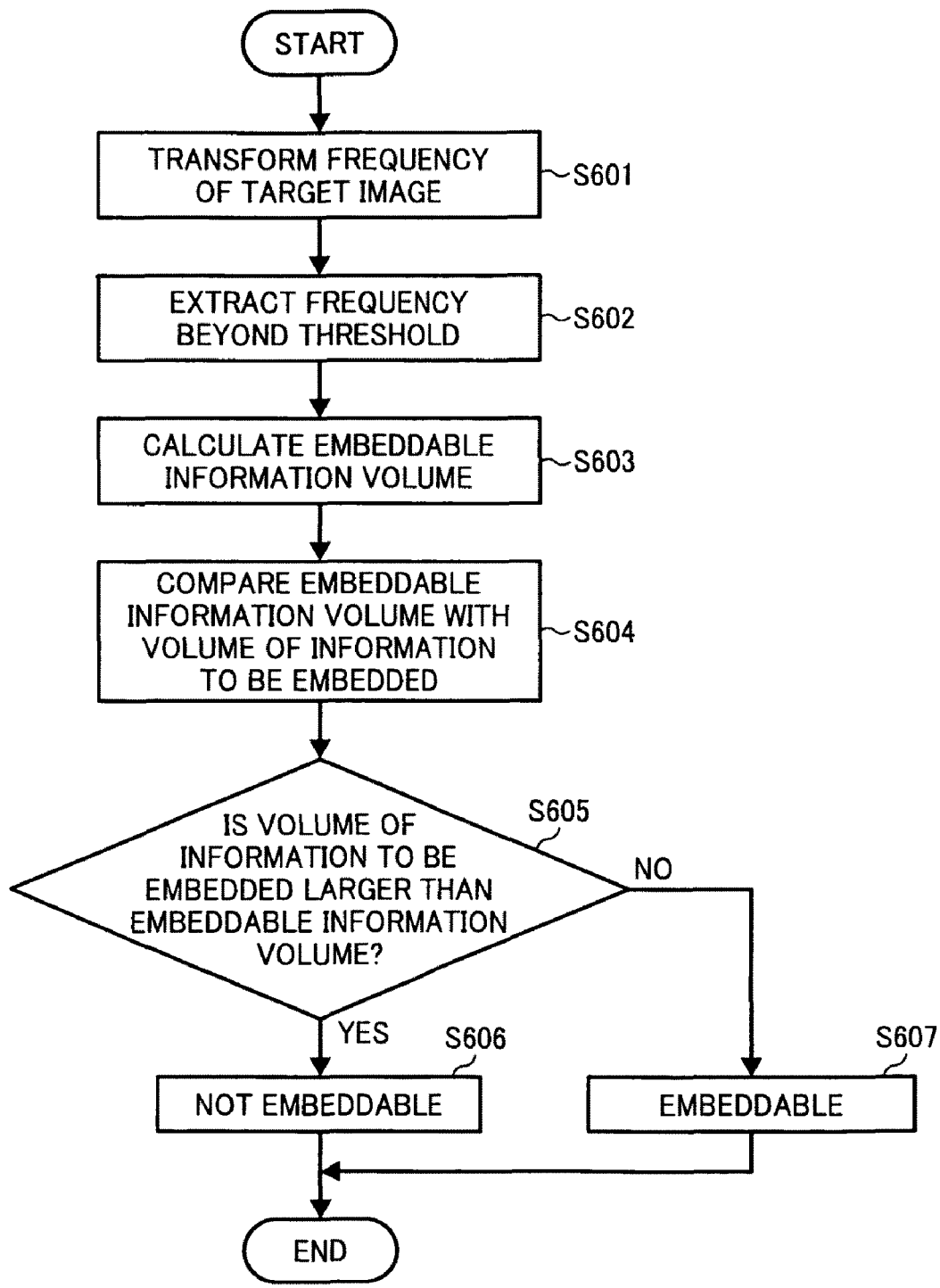
FIG. 6 is a flowchart illustrating an operation of information embeddability determination.

FIG. 6 is a flowchart illustrating a procedure of embeddability determination processing executed when the frequency transformation mode is designated as the information embedment mode. Receiving an instruction for embeddability determination, at S601 the embeddability determination device 117 transforms the frequency of a target image, and acquires information on frequency components of the target image. Out of the frequency components acquired at S601, at S602 the embeddability determination device 117 extracts areas of frequencies above a threshold frequency input as an embedment setting. The frequency components extracted at S602 indicate the areas at which information is embeddable in the target image.

Finishing the extraction of frequency components above the threshold frequency, at S603 the embeddability determination device 117 calculates the volume of information embeddable in the target image based on the extracted frequency components. At S603 the information on embedment intensity designated at the intensity selection portion 202c illustrated in FIG. 4 is also referred. When the embeddable information volume is calculated, at S604 the embeddability determination device 117 compares the volume of embedment information designated at the embedment information designation device 201 illustrated in FIG. 4 with the embeddable information volume calculated at S603. As a result of the comparison at S604, if the embedment information volume is greater than the embeddable information volume ("YES" at S605), at S606 the embeddability determination device 117 determines that the information to be embedded is not embeddable in the target image. By contrast, if the embedment information volume is smaller than the embeddable information volume ("NO" at S605), at S607 the embeddability determination device 117 determines that the information to be embedded is embeddable in the target image.

Figure 7:
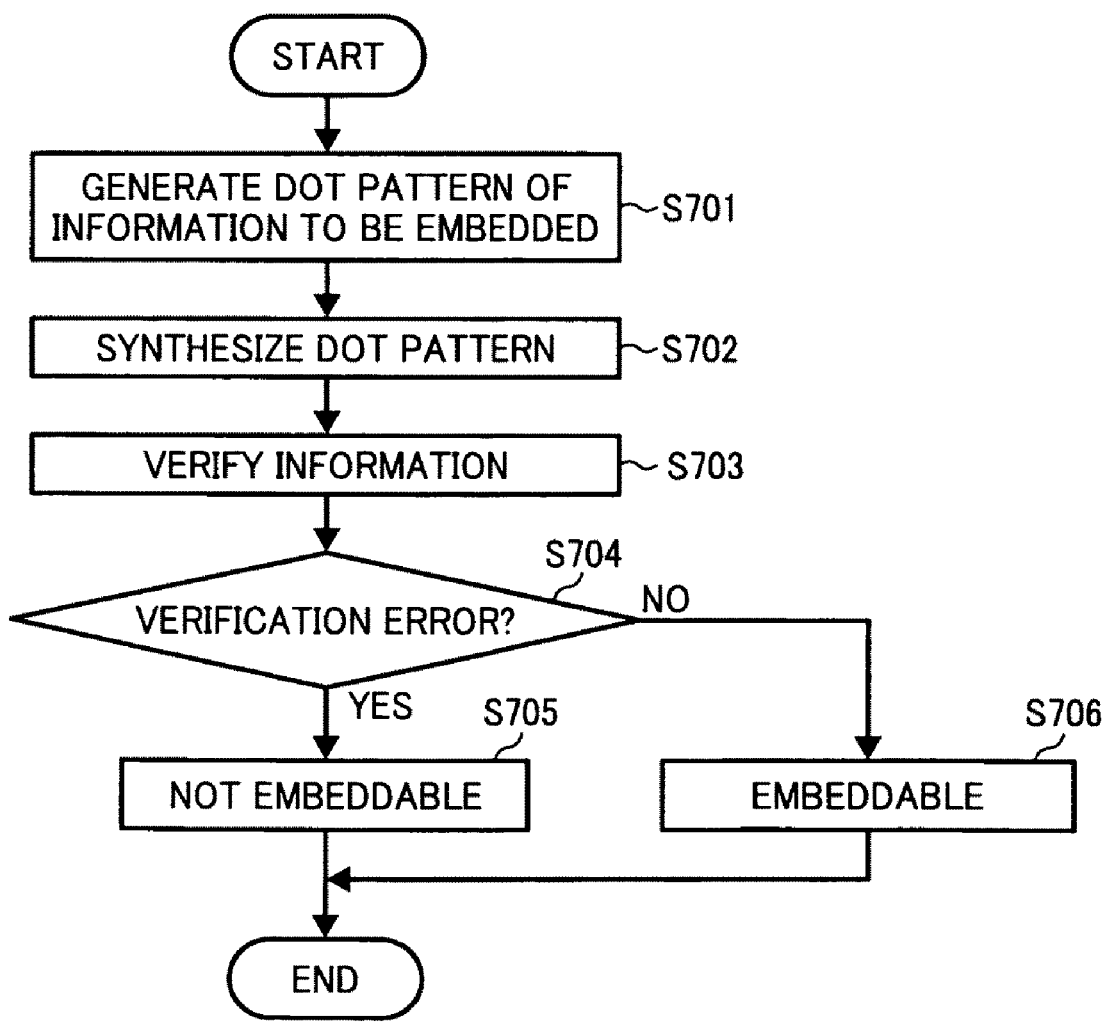
FIG. 7 is a flowchart illustrating another operation of information embeddability determination.

FIG. 7 is a flowchart illustrating a procedure of embeddability determination (verification) executed when the dot pattern mode is designated as the information embedment mode.

To verify the embeddability of information into a target image, the embeddability determination device 117 may include an embedment-information embedding unit to embed embedment information (verification information) on the information to be embedded in image information on the target image and an embedment-information extracting unit to extract the embedment information from the image information.

For example, as illustrated in FIG. 7, when receiving an instruction for embeddability determination, at S701 the embeddability determination device 117 encodes embedment information designated at the embedment information designation device 201 illustrated in FIG. 4 to generate a dot pattern superimposed onto a target image. Finishing the generation of the dot pattern, at S702 the embedment-information embedding unit of the embeddability determination device 117 superimposes the dot pattern onto image information of the target image to generate a composite image. Based on the dot pattern, at S703 the embedment-information extracting unit of the embeddability determination device 117 extracts the embedment information from the composite image generated at S702 to verify the embedment information. As a result of the verification at S703, if a failure to read the embedment information, i.e., a verification error occurs ("YES" at S704), at S705 the embeddability determination device 117 determines that the information to be embedded is not embeddable in the target image. By contrast, as a result of the verification at S703, if the embedment information is properly read ("NO" at S704), at S706 the embeddability determination device 117 determines that the information to be embedded is embeddable in the target image.

Figure 8:
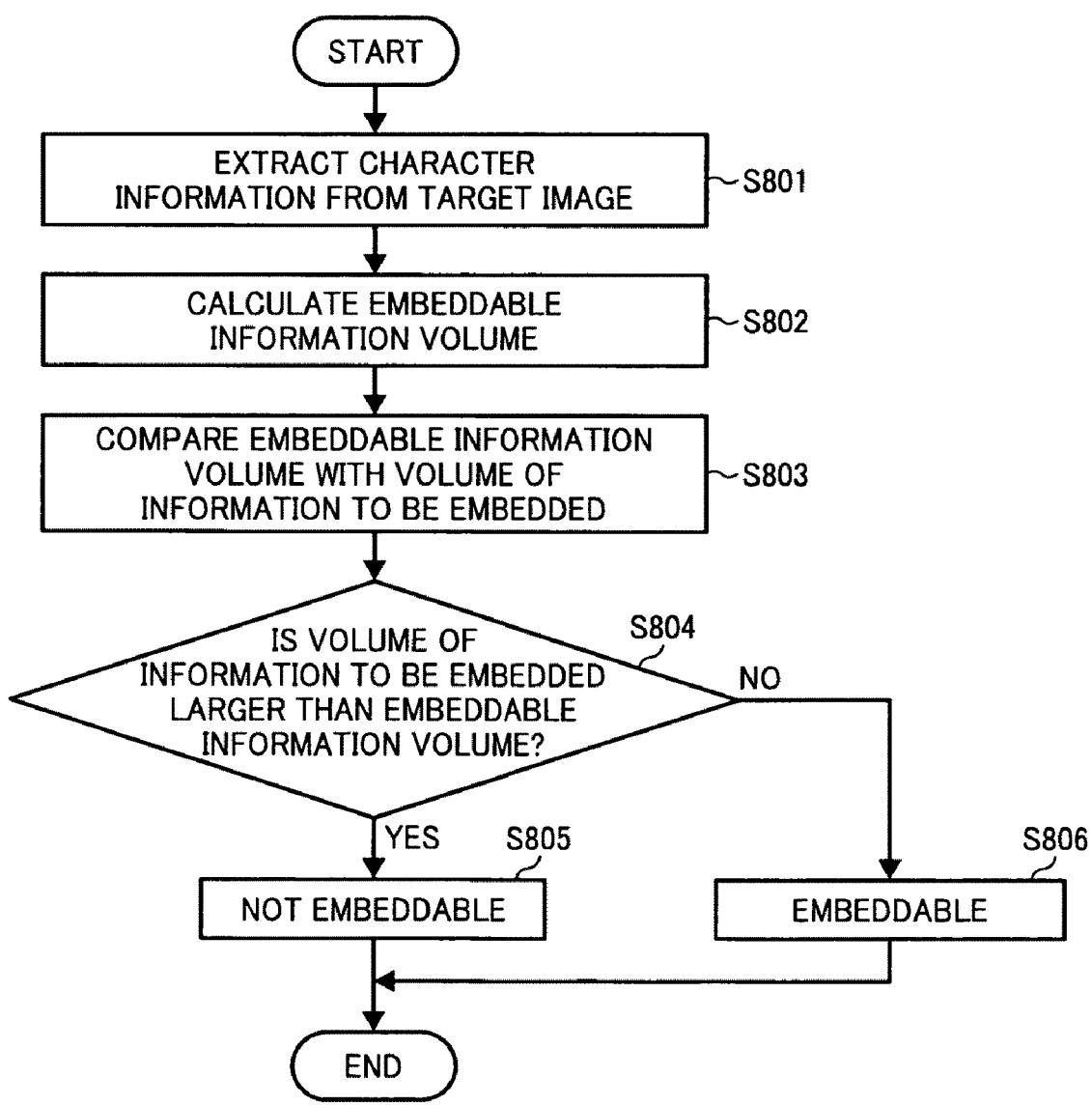
FIG. 8 is a flowchart illustrating still another operation of information embeddability determination.

FIG. 8 is a flowchart illustrating a procedure of embeddability determination processing executed when the "outline modification mode" is designated as the information embedment mode. Receiving an instruction for embeddability determination, at S801 the embeddability determination device 117 acquires content from a target image in which information is to be embedded. Based on the acquired content, at S802 the embeddability determination device 117 calculates the volume of information embeddable in the target image. At S802, information on the embedment intensity designated at the intensity selection device 202*c* illustrated in FIG. 4 is also referred. When the embeddable information volume is calculated, at S803 the embeddability determination device 117 compares the volume of embedment information designated at the information designation section 201 illustrated in FIG. 4 with the calculated embeddable information volume. The processing steps subsequent to S803 are executed in a similar manner to the processing steps subsequent to S604 described with reference to FIG. 6.

Through the above-described processing, at S307 of FIG. 3 the embeddability determination device 117 determines whether or not the information to be embedded is embeddable in the target image and transmits a determination result to the main controller 111. Receiving the determination result from the embeddability determination device 117, at S308 the main controller 111 instructs the input-and-output controller 113 to transmit the determination result. Controlled by the main controller 111, at S309 the input-and-output controller 113 transmits information on the determination result to the client machine 2 via the network I/F 104. Receiving the information on the determination result, at S310 the client machine 2 displays the determination result. Through the above-described procedure, it is determined whether or not desired information is embeddable in a target image for print output, and a determination result is displayed in the GUI of the client machine 2.

Next, with reference to drawings, a description is given of such a determination result displayed in the display device of the client machine 2.

Figure 9:
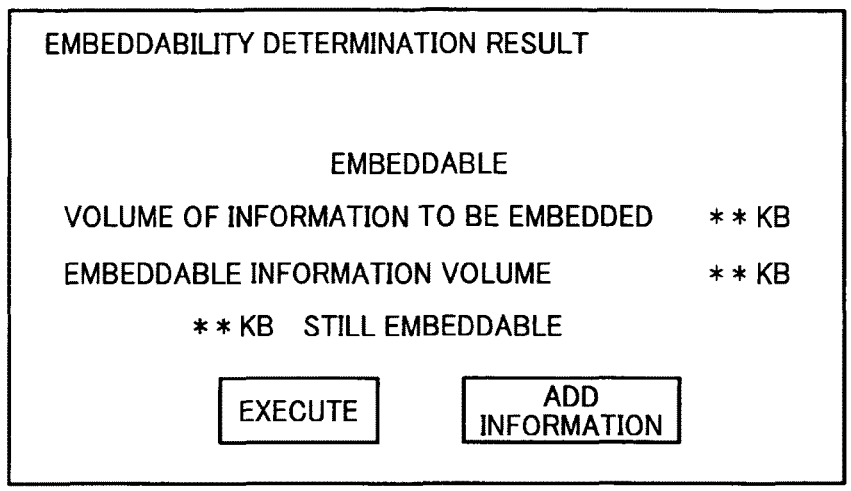
FIG. 9 is an illustration showing a display example of a report screen of information embeddability.

FIG. 9 shows a display example of the GUI when it is determined that information is embeddable in a target image. As illustrated in FIG. 9, on the GUI in the display device of the client machine 2 is indicated a status that all of the information designated as embedment information is embeddable, a total information volume (kilo-byte: KB) designated as embedment information, an embeddable information volume (KB), and a remaining embeddable volume (KB). On the GUI are displayed an "execution" button for instructing execution of image formation and an "add information" button for instructing addition of embedment information. For example, when a user operates a mouse or any other suitable user interface to click the "execution" button, the client machine 2 transmits a signal for instructing the image processing apparatus 1 to execute print output. Further, when the "add information" button is clicked, the setting screen 200 illustrated in FIG. 4 is displayed again so that a user can add or change embedment information and change embedment mode.

Figure 10A:
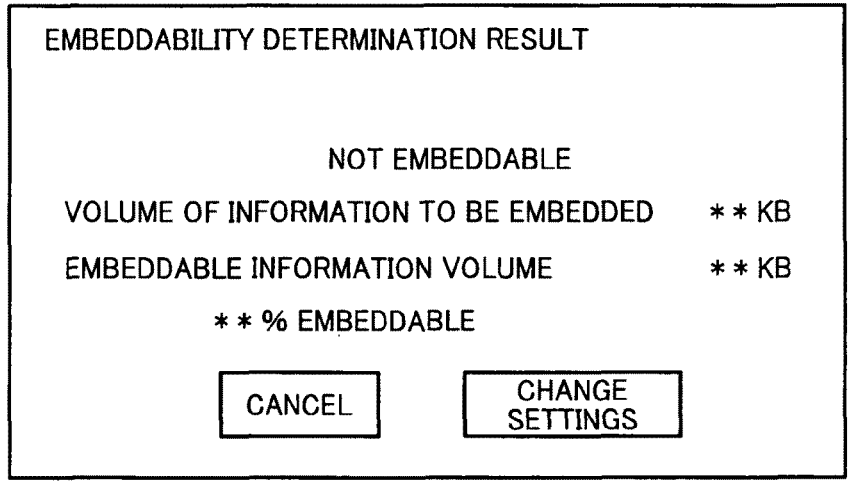
FIGS. 10A and 10B are illustrations showing other display examples of the report screen of information embeddability.
Figure 10B:
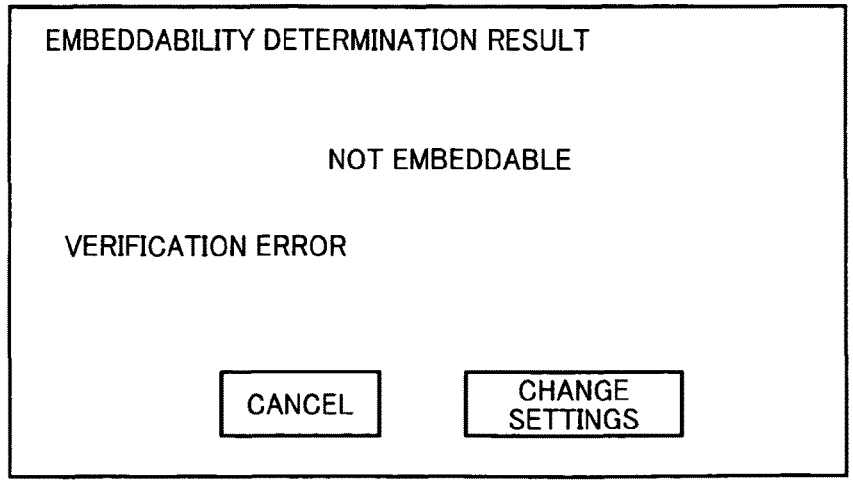

FIGS. 10A and 10B show display examples of the GUI when it is determined that information is not embeddable in a target image. When it is determined that information is not embeddable in a target image, such different screens are displayed depending on an embedment mode selected in the mode selection device 202*a*. FIG. 10A shows a display example of the GUI when the frequency transformation mode or the outline modification mode is selected. As illustrated in FIG. 10A, on the display device of the client machine 2 are displayed an indication that information designated as embedment information is not embeddable, and additionally a total information volume (KB) designated as embedment information, an embeddable information volume (KB), and an achievement ratio (%) of the embeddable information volume to the total information volume.

As illustrated in FIG. 10A, when an embedment information volume, embeddable information volume, and embeddable percentage are displayed, a user can recognize how much embedment information should be reduced or how embedment setting should be changed. Further, on the GUI are displayed a "cancel" button for canceling image formation and a "change settings" button for instructing change of embedment settings. For example, when a user operates a mouse or any other suitable user interface to click the "cancel" button, the client machine 2 transmits a signal for instructing the image processing apparatus 1 to cancel the execution of print output. Alternatively, when the "change settings" button is clicked, the setting screen 200 illustrated in FIG. 4 is displayed again so that a user can add or change embedment information or change the embedment mode. FIG. 10B shows a display example of the GUI when the dot pattern mode is selected. As illustrated in FIG. 10B, on the display device of the client machine 2 are displayed indications that the information designated as embedment information is not embeddable and that the verification of information embedded in an image has failed. Further, as in the case with FIG. 10A, on the GUI are displayed a "cancel" button and a "change settings" button.

Displaying the GUI as illustrated in FIGS. 9, 10A or 10B allows a user to easily recognize a determination result of the embeddability of information. Further, providing an "add information" button or a "change settings" button allows a user to easily add embedment information or change the embedment mode based on the determination result. As described above, according to the present illustrative embodiment, when information is embedded in an image, the image processing system facilitates determining the embeddability of information into the image, thereby allowing a user to easily select an appropriate information embedment mode.

In the above-described example illustrated in FIGS. 7 and 10B, when the dot pattern mode is selected, it is determined that information is not embeddable based on a verification error. Such a verification error may occur, for example, because, when a dot pattern generated for information embedment is superimposed onto a target image, a portion of the dot pattern assimilates into a portion of the target image, thereby preventing the dot pattern from being properly read. Further, as in the cases with other information embedment modes, a lack of embeddable information volume prevents information from being embedded in a target image in the dot pattern mode. This is because embeddable information volume varies with dot pattern density, embedment intensity, and target image size. Accordingly, when the dot pattern mode is selected as the information embedment mode, both the embeddability determination based on information volume and the above-described verification may be executed. For the dot pattern mode, when it is determined that information is not embeddable based on information volume, an embedment information volume and embeddable information volume may be reported with the GUI illustrated in FIG. 10A, instead of the GUI illustrated in FIG. 10B.

In the above-described example, even when the embeddability determination device 117 determines that information is embeddable, the image processing apparatus 1 reports a determination result to the client machine 2 and executes print output in response to the user's operation of the "execution" button. Such a configuration allows a user to, for example, add embedment information, increase embedment intensity, or change the information embedment mode between a perceptible embedment mode and an non-perceptible embedment mode based on the determination result. Meanwhile, it is to be noted that, when the embeddability determination device 117 determines that information is embeddable, the image processing apparatus 1 may continue print output without reporting the determination result to a user, thereby reducing user's efforts.

In the above-described example, when the embeddability determination device 117 determines that information is not embeddable, the GUIs illustrated in FIGS. 10A and 10B are displayed in the client machine 2 to prompt a user to do further operation. In another example, when the embeddability determination device 117 determines that information is not embeddable, the embeddability determination device 117 may determines the embeddability of information after automatically changing parameters. Such parameters include, for example, an embedment frequency threshold illustrated in FIG. 5A, dot density illustrated in FIG. 5B, dot size, and unit bit size illustrated in FIG. 5C. As a result, when it is determined that information is embeddable, for example, the GUI illustrated in FIG. 10A or 10B may display how a user should change parameters to make the information embeddable. Alternatively, when such parameter change makes the information embeddable, the embeddability determination device 117 may automatically change parameters to embed the information without reporting the determination result to the user, thereby reducing user's efforts.

In still another example, when it is determined that information is not embeddable, the embeddability determination device 117 determines the embeddability in other information embedment modes. As a result, an information embedment mode determined as an embeddable mode may be displayed on the GUI illustrated in FIG. 10A or 10B, thereby allowing a user to more easily change embedment settings. Alternatively, when changing one information embedment mode into another information embedment mode makes the information embeddable, the embeddability determination device 117 may automatically embed the information using the embeddable mode without reporting the determination result to a user, thereby reducing user's efforts.

Figure 11:
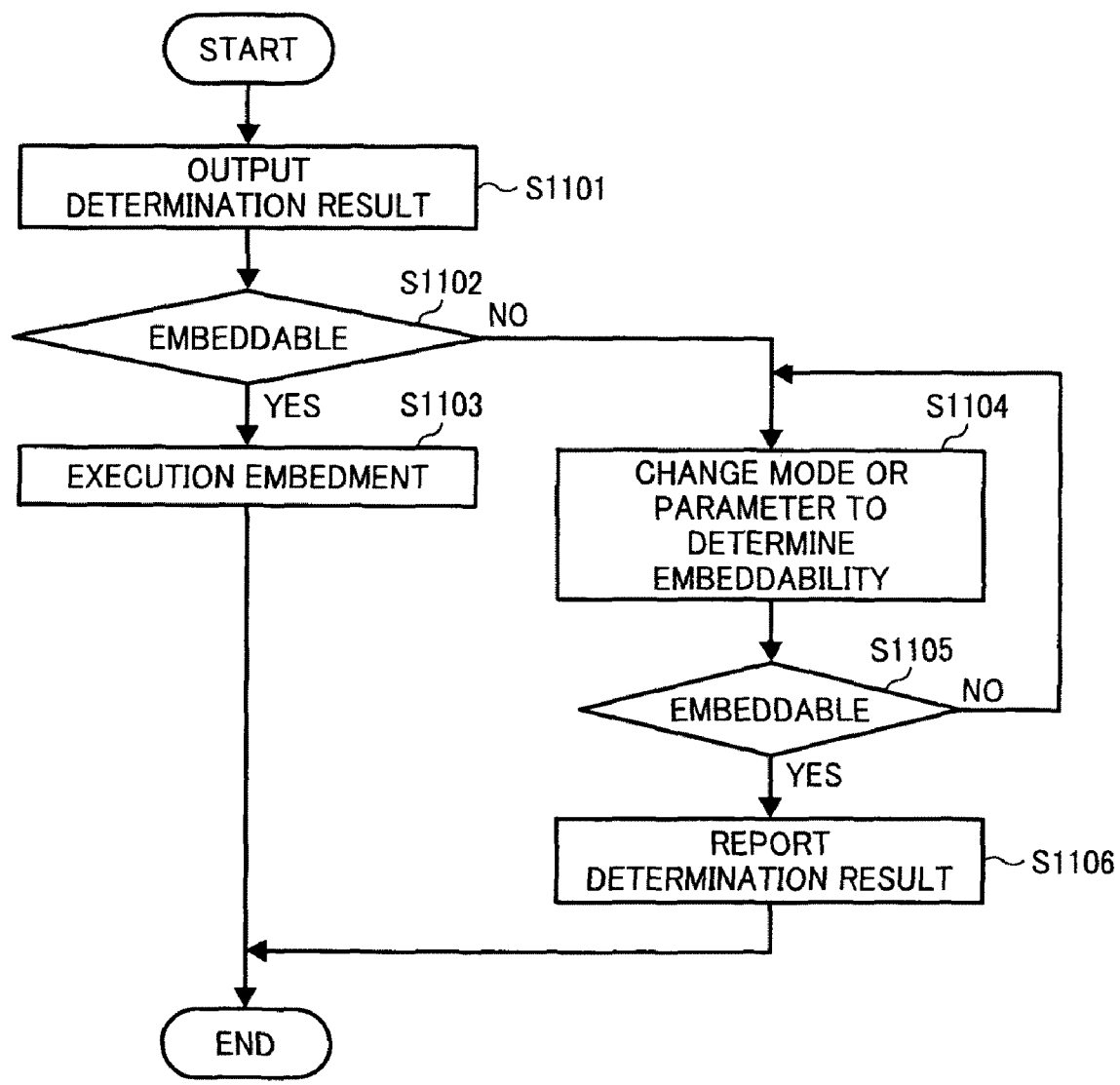
FIG. 11 is a flowchart illustrating an operation of reporting a result of information embeddability determination according to another illustrative embodiment.

FIG. 11 is a flowchart illustrating a procedure of the above-described examples. As described above, the embeddability determination device 117 executes embeddability determination and outputs a determination result at S1101. When the main controller 111 refers to the determination result and the result indicates that information is embeddable in a target image ("YES" at S1102), at S1103 the main controller 111 instructs the information embedment device 116 to embed the information into the target image. By contrast, when the result indicates that the information is not embeddable in the target image ("NO" at S1102), at S1104 the main controller 111 instructs the embeddability determination device 117 to change information embedment modes or parameters to determine the embeddability of information. In a determination result at S1104, if it is determined that the information is embeddable ("YES" at S1105), at S1106 the main controller 111 generates information on the determination result as well as information on the newly designated embedment mode or parameters, and instructs the input-and-output controller 113 to report the determination result. By contrast, in the determination result at S1104, if it is determined that the information is not embeddable ("NO" at S1105), at S1104 the main controller 111 repeatedly instructs the embeddability determination device 117 to change information embedment modes or parameters to determine the embeddability of information.

In FIG. 11, when a result of the embeddability determination with the newly designated embedment mode or parameters indicates that the information is not embeddable in the target image, the newly designated information embedment mode or parameters are repeatedly changed to determine the embeddability of information. The repeat number of S1104 may be limited. For example, the determination result at S1104 indicates consecutively three times that the information is not embeddable, the main controller 111 may report the determination result without further changing embedment modes or parameters to determine the embeddability. Such a configuration can prevent embeddability determination from being endlessly repeated. Alternatively, as described above, if it is determined that the information is embeddable with the embedment mode or parameters newly designated at S1104 ("YES" at S1105), the embeddability determination device 117 automatically embeds the information into the image, thereby reducing user's efforts.

In the above-described example, a print job is input from the client machine 2 to the image processing apparatus 1 is described as one example. Meanwhile, the present illustrative embodiment is also applicable to an operation of copying a document scanned with the scanner unit 102. For example, a user may input information from the setting screen 200 illustrated in FIG. 4, and transmit the information along with an execution instruction for copying a document placed on the ADF 101 of the image processing apparatus 1 or the image pickup face of the scanner unit 102. The image processing apparatus 1 performs the above-described operation on the image information scanned using the scanner unit 102 and generated using the image processing device 114, instead of the image information designated as a print target in a print job. Such a configuration can provide substantially the same effects as in the case with the print job.

In the above-described examples, the operations assuming image formation based on a print job or copying instruction are described. Meanwhile, the present illustrative embodiment is applicable to when image information including embedded information is also stored into the HDD 110 of the image processing apparatus 1 or the storage devices of the client machines 2 to 4. Such storage operation is performed, for example, during scan operation using the image processing apparatus 1 or when information embedded in existing image information or user-generated image information is stored. Below, the case in which information is embedded in existing image information is described with reference to FIG. 12.

Figure 12:
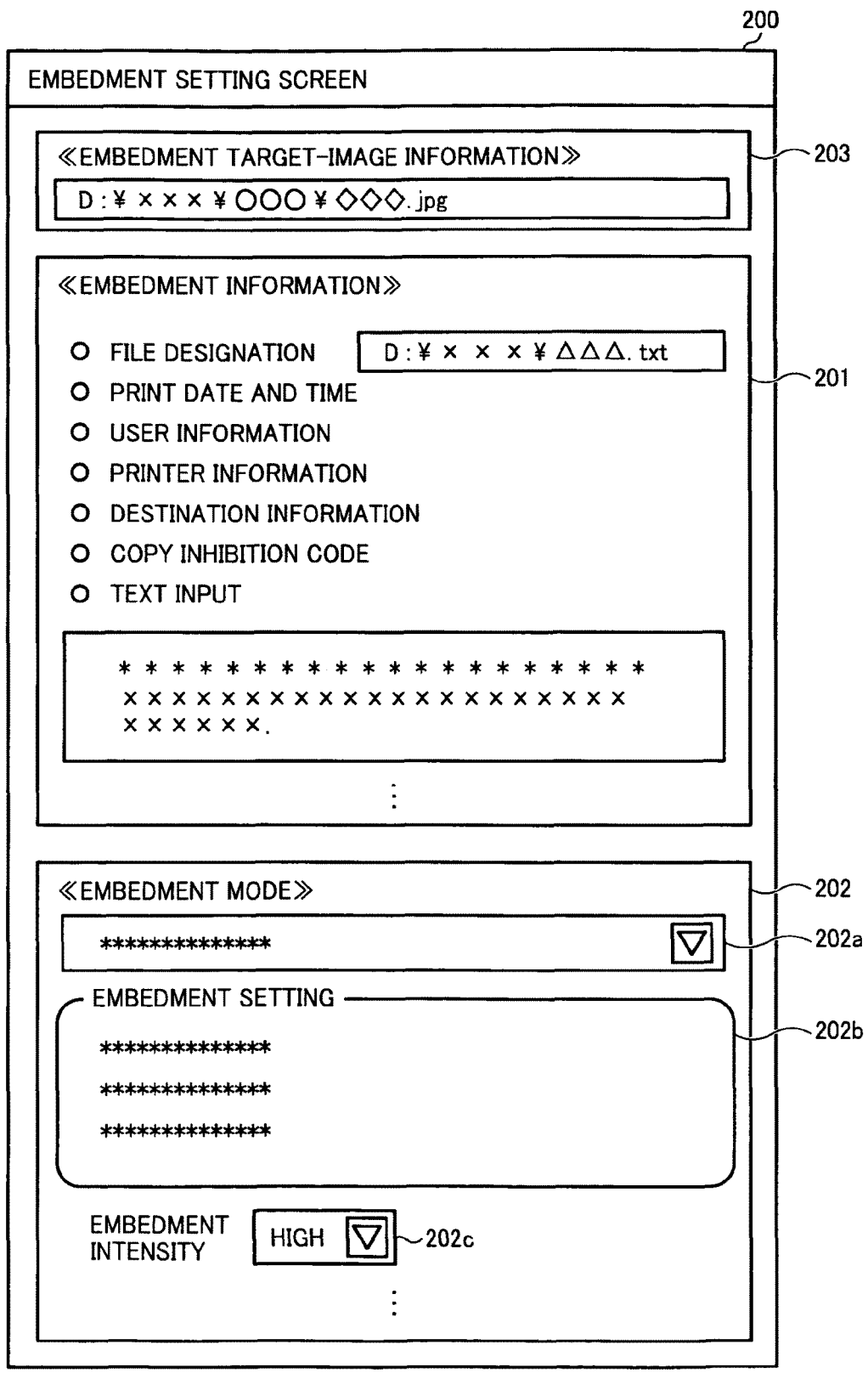
FIG. 12 is an illustration showing a display example of a setting screen for information embedment.

FIG. 12 is an illustration of a setting screen 200 used when the present illustrative embodiment is applied to processing for embedding information into an existing image. As illustrated in FIG. 12, when information is embedded in existing image information, the setting screen 200 is provided with an embedment-information designation section 201, embedment mode designation section 202, and embedment-target-image designation section 203. A user designates a target image by inputting a location (pass) at which the target image is stored. Thus, the present illustrative embodiment is applicable to processing for embedding information into an existing image.

In the above-described example, the client machine 2 transmits information to be embedded to the image processing apparatus 1 at S302 in FIG. 3. In this regard, the image processing apparatus 1 may determine the embeddability of information by extracting the volume (hereinafter "embedment information volume") of information to be embedded in the target image and comparing it with the volume (hereinafter "embeddable information volume") of information embeddable in the target image (for example, S604 of FIG. 6). In the comparison, the embedment information volume may be needed rather than the information itself to be embedded. Accordingly, at S302 of FIG. 3, the client machine 2 may transmit information indicating the embedment information volume as information on the information to be embedded. As a result, the volume of information transmitted at S302 may decrease, thereby reducing the load on the network. Alternatively, if it is determined that the information is embeddable, the image processing apparatus 1 may embed the transmitted information itself into the target image. In such a case, at S302 of FIG. 3, the image processing apparatus 1 may transmit the information itself to be embedded.

In the above-described example, the GUIs illustrated in FIGS. 4 and 12 are displayed in the display devices of the client machines 2 to 4. In other words, a user operates an operation device of any one of the client machines 2 to 4 to input embedment information or settings for information embedment. However, for example, when information is embedded in an image scanned using the scanner unit 102, a user may not use the client machines 2 to 4. In such a case, a GUI may be displayed on the display panel 105 of the image processing apparatus 1 so that a user can operates the display panel 105 to input information.

In the above-described example of FIG. 7, when the dot pattern mode is used, a dot pattern generated from the information to be embedded is superimposed on a target image, and the embedded information is verified to determine the embeddability of information. In this regard, to verify the embedded information, it is necessary to detect the dot pattern embedded in the target image. As the resolution of the target image is higher, the volume of information to be processed may become greater, thereby increasing the processing time for the verification. To reduce the processing time, the verification of embedded information may be executed with the resolution of a target image being reduced.

For such a reduction in image resolution, the resolutions of both the dot pattern and the target image may be reduced before a dot pattern may be superimposed on a target image, or the resolution of a target image in which a dot pattern has been embedded may be reduced. For example, when image resolution is reduced to one half, a dot of 2 by 2 pixels is reduced to a dot of 1 by 1 pixel. Such a reduction in image resolution might affect the detection accuracy of a dot pattern. However, for example, such a one-half reduction of image reduction does not affect conditions of white pixels around a dot, thus not causing a significant reduction in detection accuracy.

Further, in the above-described example, the frequency transformation mode, the dot pattern mode, and the outline modification mode are employed as the information embedment mode. The present illustrative embodiment is applicable not only to the above-described information embedment modes but also to any other suitable mode. For example, a "character spacing mode" in which information to be embedded in a target image is encoded by changing character spacing based on a certain rule, a mode in which code information, such as a bar code, is embedded in a target image, or any other suitable information embedment mode may be employed.

Next, a description is given of another illustrative embodiment according to the present disclosure.

In the above-described illustrative embodiment, an image of a print job, a scanned image, or an existing image is designated as a target for information embedment. In this illustrative embodiment, a portion of an image is designated as a target for information embedment. It is to be noted that, in this illustrative embodiment, the same reference numerals as those of the above-described illustrative embodiment indicate the same or corresponding constituent elements, and redundant descriptions thereof are omitted below.

When the frequency transformation mode described in the above-described illustrative embodiment is used, as described above, information is embedded in an area of frequency components above a certain frequency set as a threshold, thereby allowing the information to be embedded in a target image without reducing the visibility of the target image. However, for example, when encoded graphic information, such as a bar code, is in an area in which information is embedded, embedding the information may affect the reading (decoding) of encoded information using a bar-code reader even without causing any significant change in the visibility of the image by the user. Accordingly, the frequency transformation mode might be unsuitable for embedding information in such an area including encoded graphical information such as a bar code.

Further, when the dot pattern mode described in the above-described illustrative embodiment is used, the encoded graphical information might overlay the dot pattern, preventing the encoded information from being properly read (or decoded). Alternatively, superimposing a dot pattern on an area including a tiny or patchy character might prevent such a character from being properly read.

Further, when the outline modification mode is used, it might be difficult to properly embed information into or read embedded information from the outline of a tiny or patchy character. Hence, according to the present illustrative embodiment, whether or not information embedment is executed and various information embedment settings can be varied for different areas of a target image.

The configurations of an image processing system 1000, an image processing apparatus 1, and client machines 2 to 4 according to the present illustrative embodiment are substantially the same as the configurations according to the above-described illustrative embodiment. Further, the operation of determining information embeddability according to the present illustrative embodiment is substantially the same as the above-described determination operation according to the first illustrative embodiment. However, it is to be noted that, in the present illustrative embodiment, embedment-area designation processing for designating an area of a target image in which information is to be embedded is executed in addition to the processing described above with reference to FIG. 3 in the first illustrative embodiment. The embedment-area designation processing may be also executed in parallel with, before, or after the processing executed at S302 of FIG. 3.

A detailed description is given below of the embedment-area designation processing.

Figure 13:
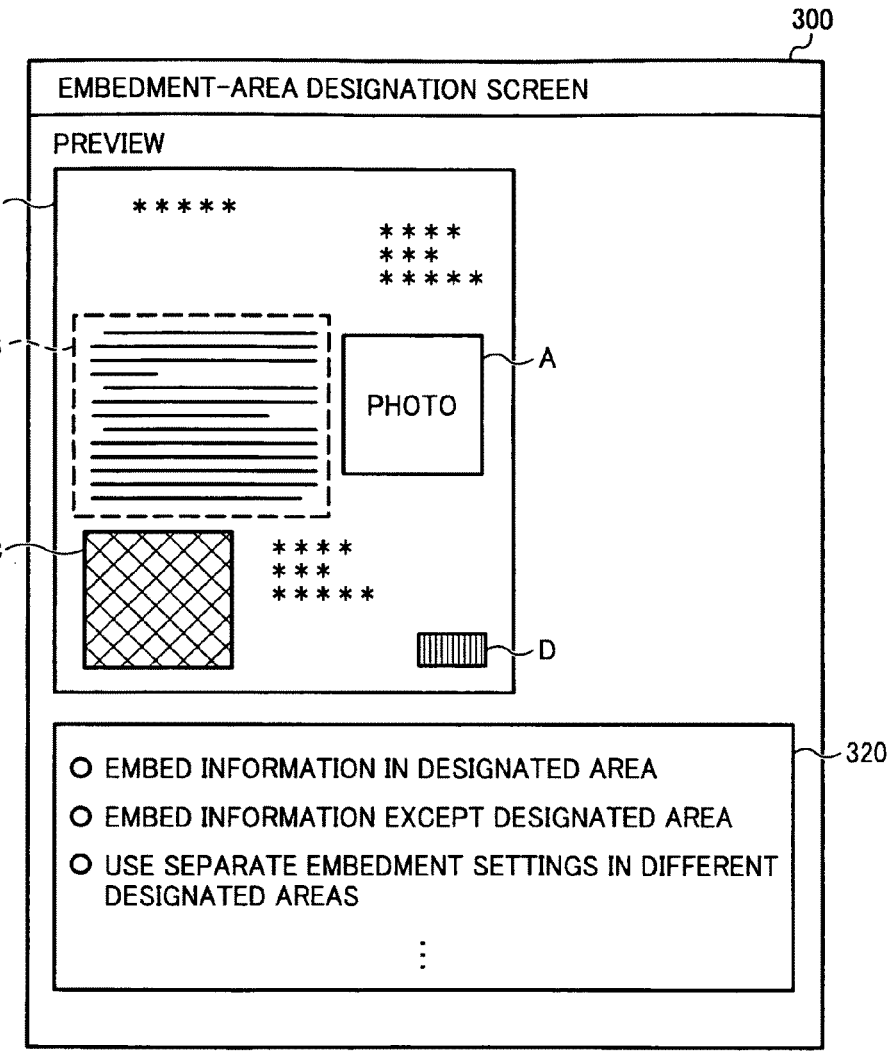
FIG. 13 is an illustration showing a display example of a setting screen for information embedment.

FIG. 13 is an illustration of an embedment-area designation screen 300 serving as a GUI with which a user designates an area for embedding information. As illustrated in FIG. 13, the embedment-area designation screen 300 includes a preview section 310 to display a target image in which information is to be embedded and a processing designation section 320 in which information embedment processing of a designated area is designated. A user designates an area in the preview section 310 using an interface, such as a mouse, and also a desired processing manner, such as "embed information in only a designated area," "embed information except a designated area," or "use separate embedment settings in different designated areas," in the processing designation section 320.

Information on the embedment area designated in the preview section 310 is generated as coordinate information. Information on the processing designated in the processing designation section 320 is generated as area designation information, and reported along with the coordinate information and other information to the image processing apparatus 1 at S302 of FIG. 3. At S303 to S305, the image processing apparatus 1 according to the present illustrative embodiment executes the same processing as the processing according to the above-described illustrative embodiment. It is to be noted that, in the present illustrative embodiment, the coordinate information and the area processing information are reported to a main controller 111 at S303. At S305, the main controller 111 designates an area of the target image in which information is to be embedded based on the received coordination information, designates a processing manner of the designated area based on the area processing information, and instructs an embeddability determination device 117 to determine whether or not the information to be embedded is embeddable in the target image. The embeddability determination device 117 executes the embeddability determination in accordance with the control of the main controller 111.

According to the present illustrative embodiment, as illustrated in FIG. 13, a target image in which information is to be embedded may include a photographic area A in which a photographic image is displayed, a small character area B in which a relatively small character(s) is drawn compared to a character drawn in other area, a hatching area C in which a mesh figure is drawn, and a bar-code area D in which a bar code is drawn. As described above, embedding information into such areas might result in difficulties in the extractability of embedded information or visibility of the target image.

Below, settings for information embedment capable of preventing occurrences of such difficulties are described with reference to drawings. Incidentally, the following description is made based on a case in which the dot pattern mode is used.

Figure 14:
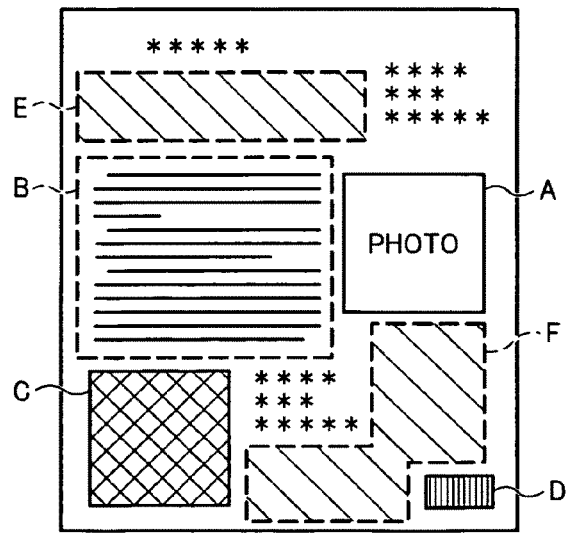
FIG. 14 is an illustration showing an example of information embedment setting.

FIG. 14 is an illustration showing a setting example in which information is embedded in areas designated in the embedment-area designation screen 300. As illustrated in FIG. 14, for example, blank areas E and F may be designated in the preview section 301 of the embedment-area designation screen 300, and the item "embed information into designated area" may be checked in the processing designation section 320 of FIG. 13. In such a case, as illustrated in FIG. 14, a dot pattern is superimposed only on the designated area, thereby preventing the visibility of a target image from being reduced. In this regard, when designating an area in the preview section 310, a rectangle or polygon, such as in the area E or F of FIG. 14, may be designated. Further, a given-shaped area may be designated using a trajectory curve of a mouse pointer.

Figure 15:
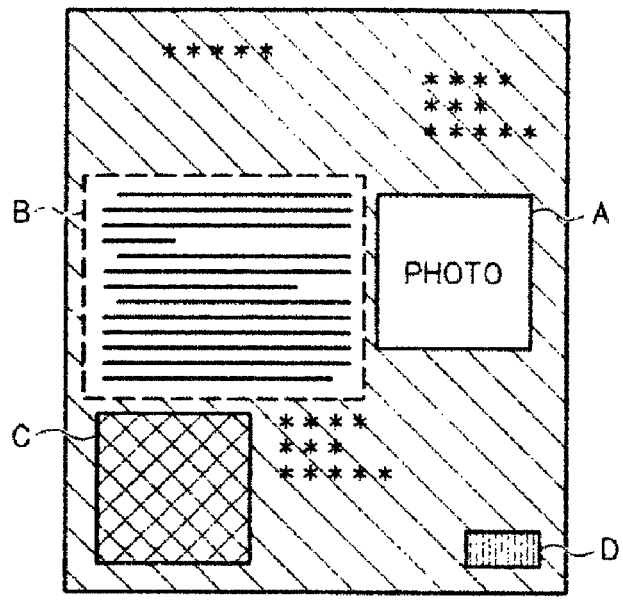
FIG. 15 is an illustration showing another example of information embedment setting.

FIG. 15 is an illustration of a setting example in which information is not embedded in areas designated in the embedment-area designation screen 300. As illustrated in FIG. 15, for example, the photographic area A, the small-character area B, the hatching area C, and the bar-code area D may be designated, and the item "embed information except designated area" may be checked in the processing designation section 320 of FIG. 13. In such a case, as illustrated in FIG. 15, a dot pattern may be superimposed on an area other than the designated area, thereby preventing a reduction in the visibility of a target image or a reading error of embedded information such as a bar cord.

Figure 16:
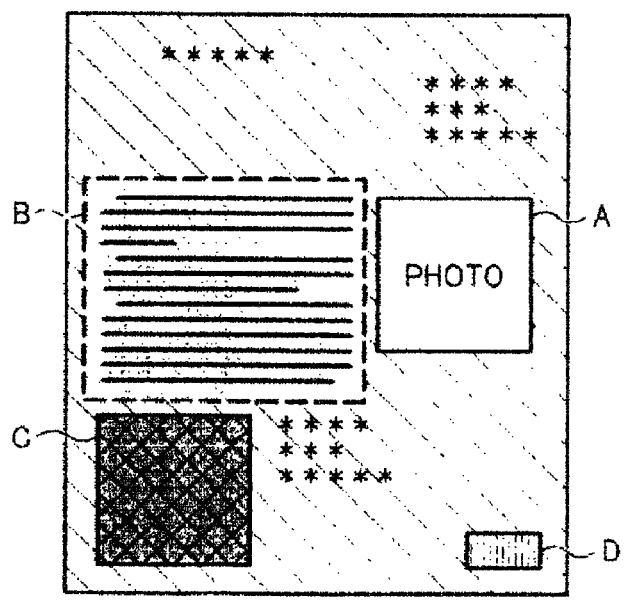
FIG. 16 is an illustration showing still another example of information embedment setting.

In the examples illustrated in FIGS. 14 and 15, the dot pattern is superimposed on an area except the above-described areas, such as the photographic area A, the small-character area B, the hatching area C, and the bar-code area D, in which superimposing the dot pattern might reduce the visibility of the target image or detectability of embedded information. However, even when such a reduction in the visibility of each area is prevented, the visibility or appearance of the target image as a whole may be reduced or degraded due to other factors, such as a contrast imbalance between the area including the dot pattern and the areas not including the dot pattern. FIG. 16 is an illustration of a setting example capable of preventing such a reduction or degradation.

FIG. 16 is an illustration of a setting example in which different embedment settings are used at respective areas designated in the embedment-area designation screen 300. In the example illustrated in FIG. 16, information is embedded in an area other than the photographic area A, the small-character area B, the hatching area C, and the bar-code area D as in the example of FIG. 15. It is to be noted that, in FIG. 16, a dummy dot pattern including dots smaller than dots for information embedment is superimposed on the photographic area A, the small-character area B, and the hatching area C. Accordingly, in FIG. 16, the photographic area A, the small-character area B, the hatching area C, and the bar-code area D are designated in the preview section 310 of the embedment-region designation screen 300, and the item "use separate embedment settings in different designated areas". Accordingly, separate embedment settings are set for respective designated areas in the setting screen 200 described with reference to FIGS. 4 and 12 in the above-described illustrative embodiment.

Specifically, for the dummy dot pattern superimposed on the photographic area A, the small-character area B, and the hatching area C, the size of a dot pattern is set smaller than the dot pattern superimposed on other areas. Such a configuration can prevent a reduction in the visibility of a photographic image drawn in the photographic area A or a character drawn in the small-character area B. Meanwhile, in the bar-code area D, the dummy dot pattern may not be superimposed or the dot size may be set to zero. As described above, the dummy dot pattern superimposed on the photographic area A, the small-character area B, and the hatching area C may be different in dot size from the dot pattern for information embedment superimposed on the other areas. Alternatively, the dot density, e.g., the density of dots against the background, may be set close between the dummy dot pattern and the dot pattern for information embedment. Such a configuration can provide a substantially uniform dot density in the photographic area A, the small-character area B, the hatching area C, and the other area (except the bar-code area D) when a user see a resultant image in which information has been embedded, thereby preventing a reduction in the visibility or degradation in the general appearance of the resultant image.

In such a case, the difference in dot density between the dot pattern superimposed on the photographic area A, the small-character area B, and the hatching area C and the dot pattern superimposed on the other area may be set, for example, within 5% or to zero.

As described above, in the image processing system according to the present illustrative embodiment, designating an area in which information is to be embedded can prevent a reduction in visibility or degradation in appearance of a target image. Further, embedding information into respective areas of the target image using different settings (in the above-described example, different dot sizes) can prevent degradation in general appearance of the image.

In the above-described example of FIG. 16, to prevent degradation in general appearance, a dummy dot pattern is superimposed on the photographic area A, the small-character area B, and the hatching area C. It is to be noted that, instead of the dummy dot pattern, a dot pattern for information embedment may be superimposed on the photographic area A, the small-character area B, and the hatching area C. Further, in the above-described example of FIG. 16, the dot size of the dummy dot pattern superimposed on the photographic area A, the small-character area B, and the hatching area C is set smaller than the dot size of the dot pattern for information embedment superimposed on the other area. In such a case, too-small dots might be recognized as image noise to be canceled. For example, when scanning a printed document, too-small dots might be deleted as noise.

Figure 17:
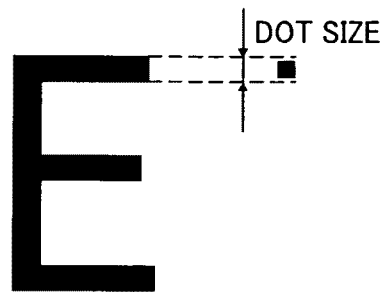
FIG. 17 is an illustration showing an example of the size of a dot superimposed on a target image for information embedment.

Thus, the dot size of the dot pattern superimposed on the photographic area A, the small-character area B, and the hatching area C may be set sufficiently large that the dots are not recognized as noise by an image pickup device, such as the scanner unit 102, yet sufficiently small that the visibility of characters in the small-character area B is not reduced. Such a small size that the visibility of characters is not reduced is, for example, a size smaller than the width of a line constituting a character as illustrated in FIG. 17, or a size smaller than a half of a line constituting a character.

As described above, in the embeddability determination of a designated area, it may be determined that information is not embeddable in the designated area due to a lack of information embeddable area. In such a case, the GUI illustrated in FIG. 10A may prompt a user to enlarge the designated area, thereby allowing the user to properly and easily change the embedment setting.

In the above-described example, a user manually designates an area in the embedment-area designation screen 300 illustrated in FIG. 13. It is to be noted that the image processing apparatus 1 may analyze a target image in which information is to be embedded to identify areas, such as the photographic area A, the small-character area B, and the hatching area C in which embedding the information might affect the visibility of the target image or the detectability of embedded information. Information defining such areas may be stored in advance on the HDD 110 or the memory. For example, image information on the target image is compared with definition information on a bar code stored in the HDD 110 to detect a bar-code area. Detecting such a bar-code area in the target image, the image processing apparatus 1 embeds information into an area other than the bar-code area.

For the detection of the small-character area B, character information in a target image may be extracted using a character recognition technology, such as OCR (optical character recognition). The image processing apparatus 1 compares the size of an extracted character with the size of a predetermined reference character to determine the embeddability of information in the small-character area B. Such processing allows the small-character area B to be detected. Extracting an area with such a small-size character that information embedment might affect the visibility of the target image, the image processing apparatus 1 embeds the information into an area other than the small-character area or into the small-character area using a dot pattern consisting of relatively small dots.

Alternatively, extracting an area including a patchy or improperly-drawn character using a pattern matching technology, the image processing apparatus 1 may embed information into an area other than the patchy or improperly-drawn area. Alternatively, the image processing apparatus 1 may embed information into the patchy or improperly-drawn area using a dot pattern consisting of relatively small dots. Further, the image processing apparatus 1 may include an extraction device to extract a designated key word from such character information recognized using an OCR unit, and embed information into an area other than the area in which the key word has been extracted. Such processing can secure the visibility of, for example, an important key word included in the target image.

For the detection of the photographic area A or the hatching area C, when an area including a photographic image or mesh image is extracted from the target image for information embedment, the image processing apparatus 1 embeds information into an area other than the extracted area or into the extracted area using a dot pattern consisting of relatively small dots.

Figure 18:
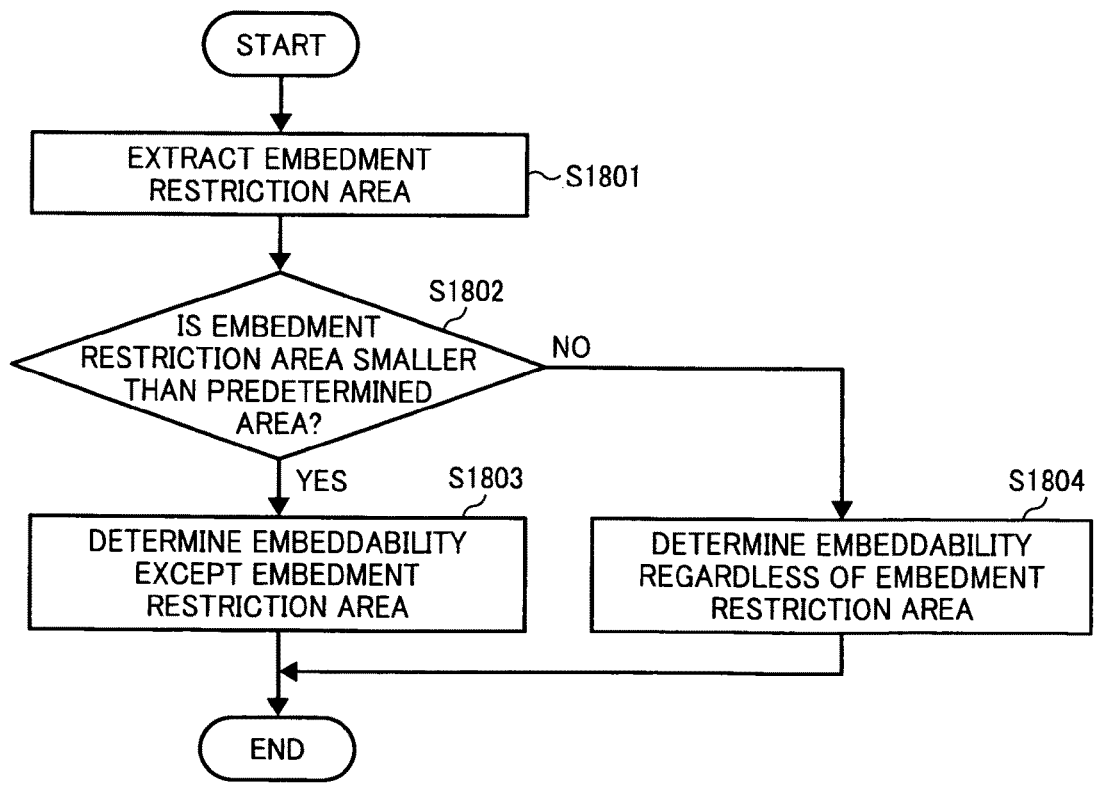
FIG. 18 is a flowchart illustrating an operation of information embeddability determination.

The image processing apparatus 1 may also detect a predetermined dot pattern or encoded information as information embedded in a target image to perform a control operation, such as copy prohibition, on the target image. In such a case, unless the detection volume of the dot pattern or encoded information is beyond a certain threshold, such a control operation might not be performed. Hence, when the size of the detected or designated area in which information is not to be embedded is not above a threshold area size, and the area in which the information is to be embedded is sufficiently secured in another area, the image processing apparatus 1 embeds the information into the other area. By contrast, when the size of the area in which the information is not to be embedded is above the threshold area size, and the area in which information is to be embedded is not sufficiently secured in the other area, the image processing apparatus 1 embeds the information over the entire target image. Such processing is described below with reference to FIG. 18.

As illustrated in S305 of FIG. 3, receiving an execution instruction of embeddability determination from the main controller 111, at S1801 the embeddability determination device 117 extracts a photographic image area, a small-character area, a mesh-drawn area, and/or other areas in which information embedment is restricted (hereinafter "embedment restriction area") from a target image in the above-described manner.

At S1802, the embeddability determination device 117 compares a predetermined threshold size with the size of each area extracted at S1801. If the embedment restriction area is not above the threshold ("YES" at S1802), at S1803 the embeddability determination device 117 determines the embeddability of information into an area other than the embedment restriction area. By contrast, if the embedment restriction area is above the threshold size ("NO" at S1802), at S1804 the embeddability determination device 117 executes embeddability determination regardless of the embedment restriction area.

Such processing can prevent the above-described possible failure from occurring in a control operation, such as copy prohibition, due to a lack of volume of the extracted dot pattern or encoded information.

As described in the above-described illustrative embodiments, in one aspect, the invention resides in an image processing apparatus including an image information acquisition device to acquire image information on a target image into which supplemental information is to be embedded, an embedment information acquisition device to acquire embedment information on the supplemental information, an embedment mode information acquisition device to acquire embedment mode information on an embedment mode in which the supplemental information is embedded in the image information, an embeddability determination device to determine embeddability of the supplemental information into the image information based on the embedment mode information acquired by the embedment mode information acquisition device, the embedment information acquired by the embedment information acquisition device, and the image information acquired by the image information acquisition device, and an embeddability information output device to output determination-result information on a determination result of the embeddability determined by the embeddability determination device.

The image processing apparatus may further include an embeddability report device to report, to a user, the determination-result information on the determination result output from the embeddability information output device.

The embeddability report device may further indicate another embedment mode different from the embedment mode of the embedment mode information acquired by the embedment mode information acquisition device when the supplemental information is not embeddable in the image information.

The embedment mode information may further include parameter information on parameters referred when the supplemental information is embedded in the image information, and, when the supplemental information is not embeddable in the image information, the embeddability report device may prompt a user to change the parameters.

The image processing apparatus may further include an information embedment device to embed the supplemental information into the image information, wherein, when the supplemental information is not embeddable in the image information, the information embedment device embeds the supplemental information in the image information using another embedment mode different from the embedment mode of the embedment mode information acquired by the embedment mode information acquisition device.

The information embedment device may change the parameters to embed the supplemental information into the image information when the supplemental information is not embeddable in the image information.

The image processing apparatus may further include an area designation information acquisition device to acquire area designation information on designation of an area in which the supplemental information is to be embedded of the image information on the target image, wherein the embeddability determination device determines the embeddability of the supplemental information into the designated area of the image information.

The information embedment device may embed the supplemental information into the designated area of the image information or one or more areas other than the designated area of the image information.

The information embedment device may refer to different parameters for the designated area and for the one or more areas of the image information.

In the embedment mode, when a dot pattern generated from the supplemental information is superimposed on an image drawn based on the image information, a first character drawn in the designated area may be smaller than a second character drawn in the one or more areas of the image information, and the information embedment device may superimpose, on the designated area, a dot pattern formed of dots smaller than dots forming another dot pattern superimposed on the one or more areas.

As described above, such configurations facilitate determining whether information is embeddable in an image and allows a user to easily select an appropriate information embedment mode.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

What is claimed is:

1. An image processing apparatus, comprising:
   an image information acquisition device to acquire image information on a target image into which supplemental information is to be embedded;
   an embedment information acquisition device to acquire embedment information on the supplemental information;
   an embedment mode information acquisition device to acquire embedment mode information on an embedment mode in which the supplemental information is embedded in the image information;
   an embeddability determination device to determine embeddability of the supplemental information into the image information based on the embedment mode information acquired by the embedment mode information acquisition device, the embedment information acquired by the embedment information acquisition device, and the image information acquired by the image information acquisition device; and
   an embeddability information output device to output determination-result information on a determination result of the embeddability determined by the embeddability determination device,
   wherein the embeddability determination device includes an embeddable volume acquisition unit to acquire embeddable volume information on a volume of information embeddable in the image information based on at least a total information volume designated as embedment information, and
   wherein, based on a comparison between a volume of the supplemental information to be embedded in the image information and the volume of information embeddable in the image information, the embeddability determination device determines the embeddability of the supplemental information into the image information.

2. The image processing apparatus according to claim 1, wherein the embeddability determination device includes an embedment-information embedding unit to embed the embedment information acquired by the embedment information acquisition device into the image information acquired by the image information acquisition device, and an embedment-information extracting unit to extract the embedment information from the image information in which the embedment information is embedded, and
   wherein the embeddability determination device determines the embeddability of the supplemental information into the image information based on the extraction of the embedment information.

3. The image processing apparatus according to claim 1, further comprising an embeddability report device to report, to a user, the determination-result information on the determination result output from the embeddability information output device.

4. The image processing apparatus according to claim 3, wherein, when the supplemental information is not embeddable in the image information, the embeddability report device prompts a user to change the embedment mode.

5. The image processing apparatus according to claim 1, further comprising an information embedment device to embed the supplemental information into the image information,
   wherein, when the supplemental information is not embeddable in the image information, the information embedment device changes the embedment mode to embed the supplemental information into the image information.

6. The image processing apparatus according to claim 1, further comprising:
   an area designation information acquisition device to acquire area designation information on designation of an area in which the supplemental information is to be embedded of the image information on the target image; and
   an information embedment device to embed the supplemental information into the image information, wherein the information embedment device applies different embedment modes to the designated area and to one or more areas other than the designated area of the image information.

7. The image processing apparatus according to claim 1, further comprising;
   an area designation information acquisition device to acquire area designation information on designation of an area in which the supplemental information is to be embedded of the image information on the target image; and
   an information embedment device to embed the supplemental information into the image information,
   wherein the embedment mode information includes parameter information on parameters referenced when the supplemental information is embedded in the image information, and wherein the information embedment device refers to different parameters for the designated area and for one or more areas other than the designated area of the image information.

8. An image processing system comprising an image processing apparatus,
   the image processing apparatus including
   an image information acquisition device to acquire image information on a target image into which supplemental information is to be embedded,
   an embedment information acquisition device to acquire embedment information on the supplemental information,
   an embedment mode information acquisition device to acquire embedment mode information on an embedment mode in which the supplemental information is embedded in the image information,
   an embeddability determination device to determine embeddability of the supplemental information into the image information based on the embedment mode information acquired by the embedment mode information acquisition device, the embedment information acquired by the embedment information acquisition device, and the image information acquired by the image information acquisition device, and
   an embeddability information output device to output determination-result information on a determination result of the embeddability determined by the embeddability determination device,
   wherein the embeddability determination device includes an embeddable volume acquisition unit to acquire embeddable volume information on a volume of information embeddable in the image information based on at least a total information volume designated as embedment information, and
   wherein, based on a comparison between a volume of the supplemental information to be embedded in the image information and the volume of information embeddable in the image information, the embeddability determination device determines the embeddability of the supplemental information into the image information.

9. The image processing system according to claim 8, wherein the embeddability determination device includes an embedment-information embedding unit to embed the embedment information acquired by the embedment information acquisition device into the image information acquired by the image information acquisition device, and an embedment-information extracting unit to extract the embedment information from the image information in which the embedment information is embedded, and
wherein the embeddability determination device determines the embeddability of the supplemental information into the image information based on the extraction of the embedment information.

10. The image processing system according to claim 8, wherein the image processing apparatus further includes an embeddability report device to report, to a user, the determination-result information on the determination result output from the embeddability information output device, and
wherein, when the supplemental information is not embeddable in the image information, the embeddability report device prompts a user to change the embedment mode.

11. The image processing system according to claim 8, wherein the image processing apparatus further includes an information embedment device to embed the supplemental information into the image information, and
wherein, when the supplemental information is not embeddable in the image information, the information embedment device changes the embedment mode to embed the supplemental information into the image information.

12. The image processing system according to claim 8, wherein the image processing apparatus further includes an area designation information acquisition device to acquire area designation information on designation of an area in which the supplemental information is to be embedded of the image information on the target image and an information embedment device to embed the supplemental information into the image information, and
wherein the information embedment device applies different embedment modes to the designated area and to one or more areas other than the designated area of the image information.

13. A method of image processing, comprising:
acquiring image information on a target image into which supplemental information is to be embedded;
acquiring embedment information on the supplemental information;
acquiring mode information on an embedment mode in which the supplemental information is embedded in the image information;
determining embeddability of the supplemental information into the image information based on the acquired embedment mode information, the acquired embedment information, and the acquired image information;
acquiring embeddable volume information on a volume of information embeddable in the image information based on at least a total information volume designated as embedment information; and
outputting determination-result information on a determination result of the embeddability,
wherein the determining includes determining the embeddability of the supplemental information into the image information based on a comparison between a volume of the supplemental information to be embedded in the image information and the volume of information embeddable in the image information.

14. The method according to claim 13, further comprising:
embedding the embedment information on the supplemental information into the image information; and
extracting the embedment information from the image information,
wherein the determining includes determining the embeddability of the supplemental information into the image information based on the information extraction.

15. The method according to claim 13, further comprising reporting, to a user, the determination-result information on the determination result,
wherein a user is prompted to change the embedment mode when the supplemental information is not embeddable in the image information.

16. The method according to claim 13, further comprising embedding the embedment information on the supplemental information into the image information,
wherein the embedment mode is changed to embed the supplemental information into the image information when the supplemental information is not embeddable in the image information.

17. The method according to claim 13, further comprising:
acquiring area designation information on designation of an area in which the supplemental information is to be embedded of the image information on the target image; and
embedding the supplemental information into the image information,
wherein, in the embedding, different embedment modes are applied to the designated area and to one or more areas other than the designated area of the image information.

* * * * *